US008575234B2

(12) United States Patent
Lee et al.

(10) Patent No.: US 8,575,234 B2
(45) Date of Patent: Nov. 5, 2013

(54) INK COMPOSITION, AND METHOD OF FORMING PATTERN, COLOR FILTER AND METHOD OF PREPARING COLOR FILTER USING THE SAME

(75) Inventors: Seung-Jun Lee, Yongin-si (KR); Gug Rae Jo, Asan-si (KR); Jae Hyuk Chang, Seongnam-si (KR); Hyun-Seok Kim, Anyang-si (KR); Sung Hee Lee, Seoul (KR); Sang-Tae Kim, Iksan-si (KR); Yong Seok Choi, Iksan-si (KR); Sung Bae Moon, Iksan-si (KR); In Kak Song, Iksan-si (KR); Seung-Yong Lee, Daejeon-si (KR)

(73) Assignees: Samsung Display Co., Ltd., Yongin (KR); Dongwoo Fine-Chem Co., Ltd., Iksan-si (KR)

( * ) Notice: Subject to any disclaimer, the term of this patent is extended or adjusted under 35 U.S.C. 154(b) by 126 days.

(21) Appl. No.: 13/223,755

(22) Filed: Sep. 1, 2011

(65) Prior Publication Data
US 2012/0058273 A1 Mar. 8, 2012

(30) Foreign Application Priority Data

Sep. 6, 2010 (KR) .................. 10-2010-0087178
Sep. 6, 2010 (KR) .................. 10-2010-0087180

(51) Int. Cl.
*C09D 11/00* (2006.01)
*C08L 31/00* (2006.01)
*C08L 33/06* (2006.01)

(52) U.S. Cl.
USPC ............... 523/160; 524/556; 524/560

(58) Field of Classification Search
USPC .................. 523/160; 524/560, 556
See application file for complete search history.

(56) References Cited

U.S. PATENT DOCUMENTS

| 6,455,207 | B1 | 9/2002 | Katoh et al. |
| 6,641,961 | B2 | 11/2003 | Takebe |
| 6,686,104 | B1 | 2/2004 | Shiba et al. |
| 2006/0036023 | A1 | 2/2006 | Kamata et al. |
| 2007/0160776 | A1* | 7/2007 | Kwon et al. ............ 428/1.1 |
| 2010/0297541 | A1 | 11/2010 | Hayoz et al. |

FOREIGN PATENT DOCUMENTS

| JP | 07-199359 | 8/1995 |
| JP | 08-314132 | 11/1996 |
| JP | 11-029550 | 2/1999 |
| JP | 2000-249822 | 9/2000 |
| JP | 2008-090283 | 4/2008 |

(Continued)

OTHER PUBLICATIONS

English language translation of KR 10-2010-0032142 pp. 1-17.*

(Continued)

*Primary Examiner* — Alexander Kollias
(74) *Attorney, Agent, or Firm* — H.C. Park & Associates, PLC

(57) ABSTRACT

An ink composition, and a method of forming a pattern, a color filter and a method of manufacturing the color filter using the same. The ink composition includes a binder resin, a multifunctional monomer having an ethylenic unsaturated double bond, a coloring agent, a polymerization initiator containing a certain positive ion and a solvent. Therefore, the composition has excellent coating property and chemical resistance and also an improved adhesion to a printing member, and thus the ink composition may be useful in forming a precise micropattern using a roll printing method, particularly a reversed printing method.

13 Claims, 4 Drawing Sheets

(56) References Cited

FOREIGN PATENT DOCUMENTS

| | | |
|---|---|---|
| JP | 2009-003330 | 1/2009 |
| JP | 2009-242469 | 10/2009 |
| JP | 2010-186151 | 8/2010 |
| KR | 1020060076417 | 7/2006 |
| KR | 10-2009-0056595 | 6/2009 |
| KR | 1020090081049 | 7/2009 |
| KR | 10-2010-0073034 | 7/2010 |
| KR | 10-2010-0032142 | * 11/2010 |

OTHER PUBLICATIONS

"Pigments," Colour Index International, Pigments and Solvent Dyes, 4th Edition Online, 2000, pp. 1-197, www.colour-index.com.

"Introduction to the Colour Index: Classification System and Terminology," Colour Index International, Society of Dyers and Colourists, 4th Edition Online, 2000, pp. 1-9, www.colour-index.com.

"Colour Index," 3rd Edition—Colorant Classes, Colour Index International, 4th Edition Online, 2000, www.colour-index.com.

* cited by examiner

INK COMPOSITION, AND METHOD OF FORMING PATTERN, COLOR FILTER AND METHOD OF PREPARING COLOR FILTER USING THE SAME

CROSS REFERENCE TO RELATED APPLICATION

This application claims priority from and the benefit of Korean Patent Application No. 10-2010-0087180, filed on Sep. 6, 2010, and Korean Patent Application No. 10-2010-0087178, filed on Sep. 6, 2010, which are both hereby incorporated by reference for all purposes as if fully set forth herein.

BACKGROUND OF THE INVENTION

1. Field of the Invention

Exemplary embodiments of the present invention relate to an ink composition that has an excellent coating property and chemical resistance and also an improved adhesion to a member to be printed, and thus is suitable for forming a precise micropattern particularly using a reversed printing method, and a method of forming a pattern, a color filter and a method of preparing a color filter using the same.

2. Discussion of the Background

Micropatterns, which have been applied to conventional displays and semiconductor circuit devices such as a liquid crystal display and a plasma display panel (PDP), have been formed by means of photolithography using a photoresist.

Photolithography has merit in that it is possible to obtain a desired precise pattern, but requires expensive exposure equipment and a high-resolution mask to maximize the effects of the photoresist, and is inefficient in terms of cost since a large amount of the photoresist is consumed in process. Also, a processing time may be increased since photolithography consists of multiple processes including exposure, baking after the exposure, development, baking after the development, etching, washing and the like, and the productivity may also be decreased since the processes should be repeated several times.

In recent years, as an alternative to photolithography, roll printing methods such as offset printing, reversed offset printing and roll-to-roll printing have been proposed.

Roll printing methods involve directly transferring a member to be printed (hereinafter referred to as a "printing member") to a pattern using a roll, or a concave or convex plate instead of the high-resolution mask used to form the pattern in photolithography. Among these, the reversed printing method includes applying a print to a surface of a blanket, pressing the blanket to a roll or plate having a reversed pattern with respect to a desired pattern to remove an ink region having an undesired pattern, and transferring the ink region of a desired pattern remaining in the blanket to a printing member. Such a method has an advantage in that a pattern having a good printing shape may be formed by reducing the ink interruption caused between the blanket and the plate and between the blanket and the printing member.

However, the pattern may be separated from the printing member during a baking process for fixing a pattern formed when the adherence between the ink and the printing member is poor. In addition, the adherence may be improved through the baking process, but a line width and gap of the pattern may be deformed as the ink runs, resulting in wrong micropatterns or poor quality.

The above information disclosed in this Background section is only for enhancement of understanding of the background of the invention and therefore may contain information that does not form any part of the prior art nor what the prior art may suggest to a person of ordinary skill in the art.

SUMMARY OF THE INVENTION

Exemplary embodiments of the present invention provide an ink composition that shows an excellent coating property and chemical resistance and also has an improved adhesion property to a printing member through application to a roll printing method, particularly a reversed printing method, and thus is capable of forming a precise micropattern.

Further, exemplary embodiments of the present invention provide a method of forming a pattern using the ink composition.

In addition, exemplary embodiments of the present invention provide a color filter and a method of preparing the color filter using the ink composition.

Additional features of the invention will be set forth in the description which follows, and in part will be apparent from the description, or may be learned by practice of the invention.

An exemplary embodiment of the present invention discloses an ink composition including: a binder resin; a multifunctional monomer having an ethylenic unsaturated double bond; a coloring agent; a polymerization initiator represented by the following Formula 1; and a solvent.

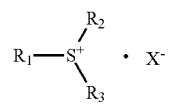

[Formula 1]

In Formula 1, each of R1, R2 and R3 is independently hydrogen, halogen, a linear, branched or cyclic alkyl group having 1 to 18 substituted or unsubstituted carbon atoms, a linear, branched or cyclic alkoxy group having 1 to 18 substituted or unsubstituted carbon atoms, an alkylcarbonyl group having 2 to 18 substituted or unsubstituted carbon atoms, an alkoxycarbonyl group having 2 to 18 substituted or unsubstituted carbon atoms, a carboxyl group, a mercapto group, a cyano group, a hydroxyl group, a nitro group, a substituted or unsubstituted phenyl group, a substituted or unsubstituted benzyl group, or a substituted or unsubstituted naphthyl group; and $X^-$ is selected from the group consisting of a halogen ion, $OH^-$, $ClO_4^-$, a sulfonate ion, a sulfate ion, a carbonate ion, a phosphate ion, a fluorophosphate ion, a borate ion, $AlCl_4^-$, $BiF_6^-$, a fluoroantimony ion and a fluoroarsenic ion.

The positive ion of the polymerization initiator of Formula 1 may be selected from the group consisting of triphenylsulfonium, tris(4-tolyl)sulfonium, benzylmethyl(4-hydroxyphenyl)sulfonium, benzylmethyl(4-acetoxyphenyl)sulfonium and methyl(4-hydroxyphenyl)(2-methylphenyl)sulfonium. The ink composition includes about 10 wt % to about 50 wt % of the binder resin, about 10 wt % to about 50 wt % of the multifunctional monomer having an ethylenic unsaturated double bond, about 5 wt % to about 60 wt % of the coloring agent and about 0.1 wt % to about 15 wt % of the polymerization initiator of Formula 1, based on the total 100 wt % solid content, and may include about 40 wt % to about 90 wt % of the solvent based on the total 100 wt % content of the composition.

The polymerization initiator of Formula 1 may be included at a content of about 2.3 wt % to about 9.5 wt %, based on the total 100 wt % solid content.

The ink composition may further include about 0.1 wt % to about 25 wt % of at least one additive selected from the group consisting of a surfactant, an adhesion promoter, an antioxidant, a pigment dispersant, a leveling agent and a hardener, based on the total 100 wt % solid content.

The binder resin may be a copolymer of a monomer having a carboxyl group and a monomer having an unsaturated bond.

The binder resin may be a copolymer of compounds represented by the following Formulas 2a to 2d.

[Formula 2]

(a)
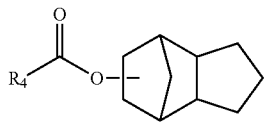

(b)
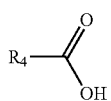

(c)
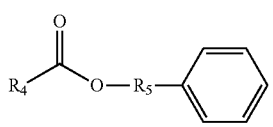

(d)
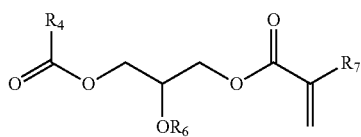

In Formulas 2a-2d, $R_4$ is independently hydrogen, an alkyl group having 1 to 6 substituted or unsubstituted carbon atoms, or an alkenyl group having 2 to 6 substituted or unsubstituted carbon atoms; $R_5$ is an alkyl group having 1 to 6 substituted or unsubstituted carbon atoms, or an alkenyl group having 2 to 6 substituted or unsubstituted carbon atoms; and $R_6$ and $R_7$ are each independently hydrogen or an alkyl group having 1 to 6 carbon atoms.

The binder resin may include a copolymer of compounds represented by the following Formulas 3a and 3b.

[Formula 3]

(a)
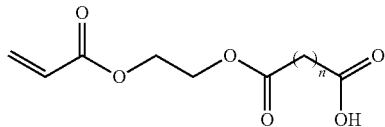

(b)
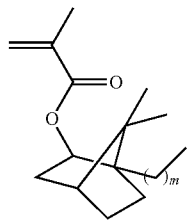

wherein n is an integer ranging from 2 to 4, and m is an integer ranging from 0 to 2.

The copolymer may be formed of about 10 wt % to 90 wt % of the compound of Formula 3a and about 90 wt % to about 10 wt % of the compound of Formula 3b.

The copolymer may further include a compound having an unsaturated bond.

The ink composition includes about 5 wt % to about 50 wt % of the copolymer, about 10 wt % to about 50 wt % of the multifunctional monomer having an ethylenic unsaturated double bond, about 5 wt % to about 70 wt % of the coloring agent, and about 0.1 wt % to about 12 wt % of the polymerization initiator of Formula 2, based on the total 100 wt % solid content, and may include about 30 wt % to about 90 wt % of the solvent, based on the total 100 wt % content of the composition.

The polymerization initiator of Formula 1 may be included at a content of about 0.8 wt % to about 6.5 wt %, based on the total 100 wt % solid content.

A viscosity of the ink may be in a range of about 1 cPs to about 11 cPs.

An exemplary embodiment of the present invention also discloses a method of forming a pattern including: preparing a substrate; applying an ink composition to a surface of a blanket; pressing the blanket, to which the ink composition is applied, to the substrate; and transferring the ink composition remaining in the surface of the blanket to a printing member. The ink composition includes a binder resin, a multifunctional monomer having an ethylenic unsaturated double bond, a coloring agent, a polymerization initiator represented by the following Formula 1, and a solvent.

[Formula 1]

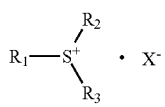

In Formula 1, each of R1, R2 and R3 is independently hydrogen, halogen, a linear, branched or cyclic alkyl group having 1 to 18 substituted or unsubstituted carbon atoms, a linear, branched or cyclic alkoxy group having 1 to 18 substituted or unsubstituted carbon atoms, an alkylcarbonyl group having 2 to 18 substituted or unsubstituted carbon atoms, an alkoxycarbonyl group having 2 to 18 substituted or unsubstituted carbon atoms, a carboxyl group, a mercapto group, a cyano group, a hydroxyl group, a nitro group, a substituted or unsubstituted phenyl group, a substituted or unsubstituted benzyl group, or a substituted or unsubstituted naphthyl group.

$X^-$ is selected from the group consisting of a halogen ion, $OH^-$, $ClO_4^-$, a sulfonate ion, a sulfate ion, a carbonate ion, a phosphate ion, a fluorophosphate ion, a borate ion, $AlCl_4^-$, $BiF_6^-$, a fluoroantimony ion and a fluoroarsenic ion.

The blanket may have an absorptance of about 0.6 to about 1.1 with respect to the ink.

The ink composition of the present invention is particularly suitable for use in a reversed printing method since the adhesion property to the printing member may be improved to secure strong adherence, and may be used to form a micropattern with high precision.

Also, since the ink composition of the present invention has a good coating property and excellent chemical resistances such as alkali resistance, solvent resistance and peel resistance, a micropattern having no inferiorities such as damage or changes in shape or thickness may be formed.

In addition, the ink composition of the present invention is suitable for preparation of a color filter, particularly a high-quality color filter layer.

Additionally, the ink composition of the present invention has a good coating property and excellent chemical resistances such as alkali resistance, solvent resistance and peel resistance, a micropattern having no inferiorities such as damage or changes in shape or thickness may be formed.

Furthermore, the ink composition of the present invention is suitable for preparation of a color filter, particularly a high-quality color filter layer.

According to exemplary embodiments of the present invention, processes are simple since there is no additional exposure process, a production yield may be improved, and it is effective in an aspect of cost.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
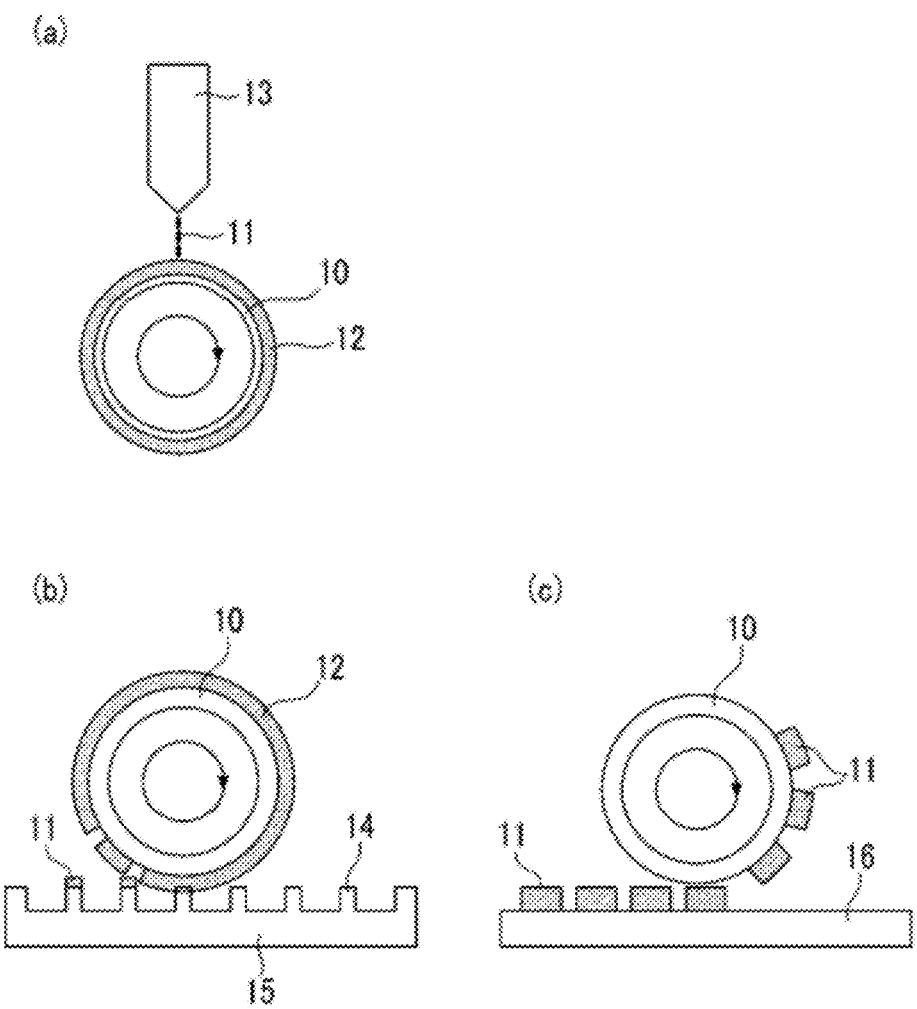
FIG. 1 is a flow diagram showing a method of forming a pattern according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Exemplary embodiments of the present invention relate to an ink composition that has an excellent coating property and chemical resistance and also shows an excellent adhesion property to a printing member, and thus is suitable for forming a precise micropattern through a reversed printing method, and a method of forming a pattern, a color filter and a method of preparing a color filter using the same.

Hereinafter, exemplary embodiments of the present invention will be described in detail.

The ink composition according to a first exemplary embodiment of the present invention includes a binder resin, a multifunctional monomer having an ethylenic unsaturated double bond, a coloring agent, a polymerization initiator represented by the following Formula 1 and a solvent:

[Formula 1]

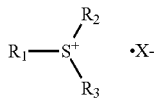

In Formula 1, each of R1, R2 and R3 is independently hydrogen, halogen, a linear, branched or cyclic alkyl group having 1 to 18 substituted or unsubstituted carbon atoms, a linear, branched or cyclic alkoxy group having 1 to 18 substituted or unsubstituted carbon atoms, an alkylcarbonyl group having 2 to 18 substituted or unsubstituted carbon atoms, an alkoxycarbonyl group having 2 to 18 substituted or unsubstituted carbon atoms, a carboxyl group, a mercapto group, a cyano group, a hydroxyl group, a nitro group, a substituted or unsubstituted phenyl group, a substituted or unsubstituted benzyl group, or a substituted or unsubstituted naphthyl group. $X^-$ is selected from the group consisting of a halogen ion, $OH^-$, $ClO_4^-$, a sulfonate ion, a sulfate ion, a carbonate ion, a phosphate ion, a fluorophosphate ion, a borate ion, $AlCl_4^-$, $BiF_6^-$, a fluoroantimony ion and a fluoroarsenic ion.

The binder resin serves as a pattern support, and may be a copolymer of a monomer having a carboxyl group and a monomer having an unsaturated bond.

The monomer having a carboxyl group is an unsaturated carboxylic acid having at least one carboxyl group in the molecule, and may, for example, include a monocarboxylic acid such as acrylic acid, methacrylic acid or crotonic acid; a dicarboxylic acid such as fumaric acid, metaconic acid or itaconic acid, or an anhydride thereof.

The kind of the monomer having an unsaturated bond may be used with no limitation as long as it is a monomer having an unsaturated double bond that is copolymerizable with the monomer having a carboxyl group. Specific examples include an unsaturated carboxylic acid ester compound such as methyl(meth)acrylate, ethyl(meth)acrylate, butyl(meth)acrylate or 2-hydroxyethyl(meth)acrylate; an unsubstituted or substituted alkylester compound of an unsaturated carboxylic acid, such as aminoethyl(meth)acrylate; an unsaturated carboxylic acid ester compound containing an alicyclic substituent, such as cyclopentyl(meth)acrylate, cyclohexyl(meth)acrylate, methylcyclohexyl(meth)acrylate, cycloheptyl(meth)acrylate, cyclooctyl(meth)acrylate, cyclopentenyl(meth)acrylate, cyclohexenyl(meth)acrylate, cycloheptenyl(meth)acrylate, cyclooctenyl(meth)acrylate, isobornyl(meth)acrylate, adamantyl(meth)acrylate or norbornyl(meth)acrylate; an unsaturated carboxylic acid ester compound containing a thermally curable substituent, such as 3-methyl-3-(meth)acryloxymethyloxetane, 3-ethyl-3-(meth)acryloxymethyloxetane or 3-methyl-3-(meth)acryloxyethyloxetane; an unsaturated glycidyl carboxylic acid ester compound such as glycidyl(meth)acrylate; an unsaturated carboxylic acid ester compound containing a substituent having an aromatic ring, such as benzyl(meth)acrylate or phenoxy(meth)acrylate; an aromatic vinyl compound such as styrene, vinyl toluene or α-methylstyrene; a carboxylic acid vinylester such as vinyl propionate; and a cyanic vinyl compound such as (meth)acrylonitrile or a-chloroacrylonitrile. These may be used alone or in a combination thereof.

In the copolymer, the monomer having a carboxyl group may be present at a content of about 5 wt % to 60 wt %, for example, at about 10 wt % to 55 wt %.

Examples of the copolymer may include a 3-ethyl-3-methacryloxymethyloxetane/benzylmethacrylate/methacrylic acid copolymer, a 3-ethyl-3-methacryloxymethyloxetane/benzylmethacrylate/methacrylic acid/styrene copolymer, and a 3-ethyl-3-methacryloxymethyloxetane/methylmethacrylate/methacrylic acid copolymer, a 3-ethyl-3-methacryloxy methyloxetane/methylmethacrylate/methacrylic acid/styrene copolymer.

Also, the binder resin is a copolymer including an additional monomer in addition to the monomer having a carboxyl group and the monomer having an unsaturated bond, and may be a copolymer of compounds represented by Formula 2a, Formula 2b, Formula 2c and Formula 2d.

[Formula 2]

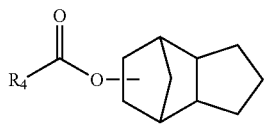

(a)

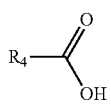

(b)

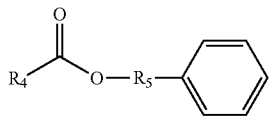

(c)

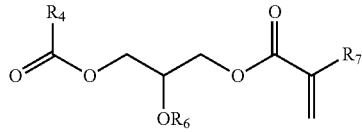

(d)

In Formulas 2a-2d, $R_4$ is independently hydrogen, an alkyl group having 1 to 6 substituted or unsubstituted carbon atoms, or an alkenyl group having 2 to 6 substituted or unsubstituted carbon atoms; $R_5$ is an alkyl group having 1 to 6 substituted or unsubstituted carbon atoms, or an alkenyl group having 2 to 6 substituted or unsubstituted carbon atoms; and $R_6$ and $R_7$ are each independently hydrogen or an alkyl group having 1 to 6 carbon atoms.

For example, $R_4$ may be an alkenyl group having 2 to 6 substituted carbon atoms 2-6, $R_5$ may be an alkyl group having 1 to 6 carbon atoms, $R_6$ may be hydrogen, and $R_7$ may be an alkyl group having 1 to 6 carbon atoms.

Also, when $R_4$ to $R_7$ are substituted, the substituents may each be independently selected from at least one substituent selected from the group consisting of a halogen atom such as fluorine, chlorine, bromine or iodine, an alkyl group having 1 to 6 carbon atoms, a perhalogenated alkyl group having 1 to 6 carbon atoms, a hydroxy group, a ketone group having 1 to 6 carbon atoms, an ester group having 1 to 6 carbon atoms, an N,N-(carbon atoms 1-3)alkyl-substituted amide group, or a combination thereof.

In, the copolymer, a weight ratio of the compounds of Formulas 2a:2b:2c:2d may be in a range of 2-60:2-70:2-90:5-50.

A method of preparing a copolymer as the binder resin is not particularly limited, and the copolymer may be prepared using a method widely used in the art, such as bulk polymerization, solution polymerization, emulsion polymerization or suspension polymerization.

The binder resin may be included at a content of about 10 wt % to about 50 wt %, based on the total 100 wt % solid content of the ink composition. In such a content range, the binder resin may serve as a pattern support and have an enhanced pattern transfer rate, thereby increasing a yield and improving the processing effectiveness.

The multifunctional monomer having an ethylenic unsaturated double bond is a component to enhance a strength of the pattern, and may include a multifunctional monomer such as polyethyleneglycolmono(meth)acrylate, polypropyleneglycolmono(meth)acrylate or phenoxyethyl(meth)acrylate; or a multifunctional monomer such as polyethyleneglycol(meth)acrylate, polypropyleneglycol(meth)acrylate, trimethylolethanetriacrylate, trimethylolpropanetriacrylate, neopentylglycol(meth)acrylate, pentaerythritoltetraacrylate, pentaerythritoltriacrylate, dipentaerythritolpentaacrylate or dipentaerythritolhexaacrylate. As a caprolactone-grafted multifunctional monomer, KAYARAD DPCA-20, 30, 60 and 120 engrafted to dipentaerythritol, KAYARAD TC-110S engrafted to tetrahydrofurylacrylate, or KAYARAD HX-220 and KAYARAD HK-620 engrafted to neopentylglycol hydroxyl pivalate may also be used. Also, U-324A, U15HA or U-4HA may be used as epoxyacrylate, novolak-epoxyacrylate or urethane-based multifunctional acrylate of the bisphenol A derivative. They may be used alone or in a combination thereof.

The multifunctional monomer having an ethylenic unsaturated double bond may be included at a content of about 10 wt % to about 50 wt %, based on the total 100 wt % solid content of the ink composition. When the content of the multifunctional monomer is less than 10 wt %, the strength of the pattern may be deteriorated, whereas when the content exceeds 50 wt %, the strength of the pattern may be deteriorated due to the excessive adherence of the solids.

The coloring agent may be an organic coloring agent such as a pigment, a dye, or a synthetic or natural coloring agent, or an inorganic coloring agent such as a metal oxide, a metal complex, or barium sulfate (a body pigment).

As the coloring agent, compounds classified into a pigment and a dye may be used within a color index (The Society of Dyers and Colourists), and may be used alone or in a combination thereof.

Specific examples of the pigment may include C.I. Pigment Yellow 1, C.I. Pigment Yellow 12, C.I. Pigment Yellow 13, C.I. Pigment Yellow 14, C.I. Pigment Yellow 15, C.I. Pigment Yellow 16, C.I. Pigment Yellow 17, C.I. Pigment Yellow 20, C.I. Pigment Yellow 24, C.I. Pigment Yellow 31, C.I. Pigment Yellow 53, C.I. Pigment Yellow 83, C.I. Pigment Yellow 86, C.I. Pigment Yellow 93, C.I. Pigment Yellow 94, C.I. Pigment Yellow 109, C.I. Pigment Yellow 110, C.I. Pigment Yellow 117, C.I. Pigment Yellow 125, C.I. Pigment Yellow 128, C.I. Pigment Yellow 137, C.I. Pigment Yellow 138, C.I. Pigment Yellow 139, C.I. Pigment Yellow 147, C.I. Pigment Yellow 148, C.I. Pigment Yellow 150, C.I. Pigment Yellow 153, C.I. Pigment Yellow 154, C.I. Pigment Yellow 166, C.I. Pigment Yellow 173; C.I. Pigment Orange 13, C.I. Pigment Orange 31, C.I. Pigment Orange 36, C.I. Pigment Orange 38, C.I. Pigment Orange 40, C.I. Pigment Orange 42, C.I. Pigment Orange 43, C.I. Pigment Orange 51, C.I. Pigment Orange 55, C.I. Pigment Orange 59, C.I. Pigment Orange 61, C.I. Pigment Orange 64, C.I. Pigment Orange 65, C.I. Pigment Orange 71, C.I. Pigment Orange 73; C.I. Pigment Red 9, C.I. Pigment Red 97, C.I. Pigment Red 105, C.I. Pigment Red 122, C.I. Pigment Red 123, C.I. Pigment Red 144, C.I. Pigment Red 149, C.I. Pigment Red 166, C.I. Pigment Red 168, C.I. Pigment Red 176, C.I. Pigment Red 177, C.I. Pigment Red 180, C.I. Pigment Red 192, C.I. Pigment Red 215, C.I. Pigment Red 216, C.I. Pigment Red 224, C.I. Pigment Red 242, C.I. Pigment Red 254, C.I. Pigment Red 264, C.I. Pigment Red 265; C.I. Pigment Blue 15, C.I. Pigment Blue 15:3, C.I. Pigment Blue 15:4, C.I. Pigment Blue 15:6, C.I. Pigment Blue 60; C.I. Pigment Purple 1, C.I. Pigment Purple 19, C.I. Pigment Purple 23, C.I Pigment Purple 29, C.I Pigment Purple 32, C.I Pigment Purple 36, C.I Pigment Purple 38; C.I. Pigment Green 7, C.I. Pigment Green 36; C.I. Pigment Brown 23, C.I. Pigment Brown 25, etc.

These pigments may be subjected to a process such as rosin treatment, surface treatment using an acidic or basic group-grafted pigment derivative, surface grafting using a polymeric compound, or washing using an organic solvent or water, when necessary.

Specific examples of the dye may include C.I. Solvent Yellow 2, C.I. Solvent Yellow 14, C.I. Solvent Yellow 16, C.I. Solvent Yellow 33, C.I. Solvent Yellow 34, C.I. Solvent Yellow 44, C.I. Solvent Yellow 56, C.I. Solvent Yellow 82, C.I. Solvent Yellow 93, C.I. Solvent Yellow 94, C.I. Solvent Yellow 98, C.I. Solvent Yellow 116, C.I. Solvent Yellow 135; C.I. Solvent Orange 1, C.I. Solvent Orange 3, C.I. Solvent Orange 7, C.I. Solvent Orange 63; C.I. Solvent Red 1, C.I. Solvent Red 2, C.I. Solvent Red 3, C.I. Solvent Red 8, C.I. Solvent Red 18, C.I. Solvent Red 23, C.I. Solvent Red 24, C.I. Solvent Red 27, C.I. Solvent Red 35, C.I. Solvent Red 43, C.I. Solvent Red 45, C.I. Solvent Red 48, C.I. Solvent Red 49, C.I. Solvent Red 91:1, C.I. Solvent Red 119, C.I. Solvent Red 135, C.I. Solvent Red 140, C.I. Solvent Red 196, C.I. Solvent Red 197; C.I. Solvent Purple 8, C.I. Solvent Purple 9, C.I. Solvent Purple 13, C.I. Solvent Purple 26, C.I. Solvent Purple 28, C.I. Solvent Purple 31, C.I. Solvent Purple 59; C.I. Solvent Blue 4, C.I. Solvent Blue 5, C.I. Solvent Blue 25, C.I. Solvent Blue 35, C.I. Solvent Blue 36, C.I. Solvent Blue 38, C.I. Solvent Blue 70; C.I. Solvent Green 3, C.I. Solvent Green 5, C.I. Solvent Green 7, etc.

The content of the coloring agent may be adjusted according to desired color characteristics, and the coloring agent may be included at a content of about 5 wt % to about 60 wt %, based on the total 100 wt % solid content of the ink composition.

The ink composition of the first exemplary embodiments of the present invention is characterized in that a thermal polymerization initiator of Formula 1 containing a sulfonium positive ion particularly selected from onia and a counter ion thereof may be selected and used. Since such a polymerization initiator has a better temporal stability and a better shrinkage ratio than the other kinds of polymerization initiators, for example, azo-based initiators, the adhesion between the ink composition and the printing member may be improved.

Also, the polymerization initiator has an excellent coating property of the ink composition, compared to polymerization initiators containing the other kinds of onium positive ions, for example, iodonium, and may enhance resolution and sensitivity and simultaneously improve an adhesion property. In this regard, a precise pattern may be formed with an increase in adherence, and the chemical resistance may be improved in subsequent processes.

[Formula 1]

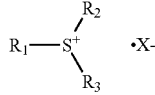

In Formula 1, each of R1, R2 and R3 is independently hydrogen, halogen, a linear, branched or cyclic alkyl group having 1 to 18 substituted or unsubstituted carbon atoms, a linear, branched or cyclic alkoxy group having 1 to 18 substituted or unsubstituted carbon atoms, an alkylcarbonyl group having 2 to 18 substituted or unsubstituted carbon atoms, an alkoxycarbonyl group having 2 to 18 substituted or unsubstituted carbon atoms, a carboxyl group, a mercapto group, a cyano group, a hydroxyl group, a nitro group, a substituted or unsubstituted phenyl group, a substituted or unsubstituted benzyl group, or a substituted or unsubstituted naphthyl group; and $X^-$ is selected from the group consisting of a halogen ion, $OH^-$, $ClO_4^-$, a sulfonate ion, a sulfate ion, a carbonate ion, a phosphate ion, a fluorophosphate ion, a borate ion, $AlCl_4^-$, $BiF_6^-$, a fluoroantimony ion and a fluoroarsenic ion.

Examples of the alkyl group having 1 to 18 carbon atoms may include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-eicosyl group, and, among these, for example, a methyl group, an ethyl group, an n-propyl group, an isopropyl group, an n-butyl group, an isobutyl group, a sec-butyl group and a tert-butyl group may be better.

Examples of the alkoxy group having 1 to 18 carbon atoms may include a methoxy group, an ethoxy group, an n-propoxy group, an isopropoxy group, an n-butoxy group, an isobutoxy group, a sec-butoxy group, a tert-butoxy group, an n-pentyloxy group, an n-hexyloxy group, an n-heptyloxy group, an n-octyloxy group, an n-nonyloxy group, an n-decyloxy group, an n-undecyloxy group, an n-dodecyloxy group, an n-tridecyloxy group, an n-tetradecyloxy group, an n-pentadecyloxy group, an n-hexadecyloxy group, an n-heptadecyloxy group, an n-octadecyloxy group, an n-nonadecyloxy group and an n-eicosyloxy group, and, among these, for example, a methoxy group, an ethoxy group, an n-propoxy group, an isopropoxy group, an n-butoxy group, an isobutoxy group, a sec-butoxy group and a tert-butoxy group may be better.

Examples of the alkylcarbonyl group having 2 to 18 carbon atoms may include an acetyl group, an ethylcarbonyl group, an n-propylcarbonyl group, an isopropylcarbonyl group, an n-butylcarbonyl group, an isobutylcarbonyl group, a sec-butylcarbonyl group, a tert-butylcarbonyl group, an n-pentylcarbonyl group, an n-hexylcarbonyl group, an n-heptylcarbonyl group, an n-octylcarbonyl group, an n-nonylcarbonyl group, an n-decylcarbonyl group, an n-undecylcarbonyl group, an n-dodecylcarbonyl group, an n-tridecylcarbonyl group, an n-tetradecylcarbonyl group, an n-pentadecylcarbonyl group, an n-hexadecylcarbonyl group, an n-heptadecylcarbonyl group, an n-octadecylcarbonyl group, an n-nonadecylcarbonyl group, and an n-eicosylcarbonyl group, and, among these, for example, an acetyl group, an ethylcarbonyl group, an n-propylcarbonyl group, an isopropylcarbonyl group, an n-butylcarbonyl group, an isobutylcarbonyl group, a sec-butylcarbonyl group and a tert-butylcarbonyl group may be better.

Examples of the alkoxycarbonyl group 2 to 18 carbon atoms may include a methoxycarbonyl group, an ethoxycarbonyl group, an n-propoxycarbonyl group, an isopropoxycarbonyl group, an n-butoxycarbonyl group, an isobutoxycarbonyl group, a sec-butoxycarbonyl group, a tert-butoxycarbonyl group, an n-pentyloxycarbonyl group, an n-hexyloxycarbonyl group, an n-heptyloxycarbonyl group, an n-octyloxycarbonyl group, an n-nonyloxycarbonyl group, an n-decyloxycarbonyl group, an n-undecyloxycarbonyl group, an n-dodecyloxycarbonyl group, an n-tridecyloxycarbonyl group, an n-tetradecyloxycarbonyl group, an n-pentadecyloxycarbonyl group, an n-hexadecyloxycarbonyl group, an n-heptadecyloxycarbonyl group, an n-octadecyloxycarbonyl group, an n-nonadecyloxycarbonyl group, and an n-eicosyloxycarbonyl group, and, among these, for example, a methoxycarbonyl group, an ethoxycarbonyl group, an n-propoxycarbonyl group, an isopropoxycarbonyl group, an to n-butoxycarbonyl group, an isobutoxycarbonyl group, a sec-butoxycarbonyl group and a tert-butoxycarbonyl group may be better.

Also when $R_1$, $R_2$ and $R_3$ are substituted, the substituents may each independently include a halogen atom, a linear, branched or cyclic alkyl group having 1 to 18 substituted or unsubstituted carbon atoms, a linear, branched or cyclic alkoxy group having 1 to 18 substituted or unsubstituted carbon atoms, an alkylcarbonyl group having 2 to 18 substituted or unsubstituted carbon atoms, an alkoxycarbonyl group having 2 to 18 substituted or unsubstituted carbon atoms, a carboxyl group, a mercapto group, a cyano group, a hydroxyl group, a nitro group and a phenyl group.

Examples of the onium positive ion in the polymerization initiator of Formula 1 may include triphenylsulfonium, tris(4-tolyl)sulfonium, tris(4-isopropylphenyl)sulfonium, tris(2,6-dimethylphenyl)sulfonium, tris(p-cyanophenyl)sulfonium, tris(4-chlorophenyl)sulfonium, diphenyl(4-hydroxyphenyl)sulfonium, methylphenyl(4-hydroxyphenyl)sulfonium, dibenzylphenylsulfonium, dibenzyl(4-hydroxyphenyl)sulfonium, benzylmethyl(4-hydroxyphenyl)sulfonium, benzylmethyl(4-acetoxyphenyl)sulfonium, methyl(4-hydroxyphenyl)(2-methylphenyl)sulfonium, dimethyl(methoxy)sulfonium, dimethyl(ethoxy)sulfonium, dimethyl(propoxy)sulfonium, dimethyl(butoxy)sulfonium, dimethyl(octyloxy)sulfonium, dimethyl(octadecanoxy)sulfonium, dimethyl(isopropoxy)sulfonium, dimethyl(tert-butoxy)sulfonium, dimethyl(cyclopentyloxy)sulfonium, dimethyl(cyclohexyloxy)sulfonium, dimethyl(fluoromethoxy)sulfonium, dimethyl(2-chloroethoxy)sulfonium, dimethyl(3-bromopropoxy)sulfonium, dimethyl(4-cyanobutoxy)sulfonium, dimethyl(8-nitrooctyloxy)sulfonium, dimethyl(18-trifluoromethyloctadecanoxy)sulfonium, dimethyl(2-hydroxyisopropoxy)sulfonium, and dimethyl(tris(trichloromethyl)methyl)sulfonium, and, among these, for example, triphenylsulfonium, tris(4-tolyl)sulfonium, benzylmethyl(4-hydroxyphenyl)sulfonium, benzylmethyl(4-acetoxyphenyl)sulfonium or methyl(4-hydroxyphenyl)(2-methylphenyl)sulfonium may be better, and benzylmethyl(4-hydroxyphenyl)sulfonium may be better still.

Also, the kinds of negative ion ($X^-$) as the counter ion of the onium positive ion in the polymerization initiator of Formula 1 are used with no particular limitation, and may include a halogen ion such as $F^-$, $Cl^-$, $Br^-$ or $I^-$; $OH^-$; $ClO_4^-$; a sulfonate ion such as $FSO_3^-$, $ClSO_3^-CH_3SO_3^-$, $C_6H_5SO_3^-$ or $CF_3SO_3^-$; a sulfate ion such as $HSO_4^-$ or $SO_4^{2-}$; a carbonate ion such as $HCO_3^-$ or $CO_3^{2-}$; a phosphate ion such as $H_2PO_4^-$, $HPO_4^{2-}$ or $PO_4^{3-}$; a fluorophosphate ion such as $PF_6^-$ or $PF_5OH^-$; a borate ion such as $BF_4^-$, $BC_6F_{54}^-$ or $B(C_6H_4CF_3)_4^-$; $AlCl_4^-$; $BiF_6^-$; a fluoroantimony ion such as $SbF_6^-$ or $SbF_5OH^-$; or a fluoroarsenic ion such as $ASF_6^-$ or $AsF_5OH^-$.

Such a polymerization initiator of Formula 1 may be used alone or in a combination thereof.

The polymerization initiator may be included at a content of about 0.1 wt % to about 15 wt %, for example, at about 0.8 wt % to 13 wt %, and, as a further example, at about 2.3 wt % to about 9.5 wt %, based on the total 100 wt % solid content of the ink composition. When the content is less than 0.1 wt %, a polymerization degree may be low and an adhesion property may be hardly improved, whereas, when the content exceeds 15 wt %, a polymerization efficiency may be deteriorated and a coating property may be poor. However, when the content is within this range, a suitable polymerization degree and coating property may be secured, and an adhesion property to a printing member may also be effectively improved.

Considering the solubility of the solvent, the dispersing property of the coloring agent and the coating property, the polymerization initiator may include to propyleneglycolmonomethylether, ethyleneglycolmonomethyletheracetate, propyleneglycolmonomethyletheracetate, propyleneglycolmonoethyletheracetate, diethyleneglycoldimethylether, cyclohexanon, 2-heptanon, 3-heptanon, 2-hydroxyethylpropionate, 3-methyl-3-methoxybutylpropionate, ethyl-3-methoxypropionate, methyl-3-ethoxypropionate, ethyl-3-ethoxypropionate, butylacetate, ethylacetate, amylpermate, isoamylacetate, isobutylacetate, isopropylacetate, methylethylketone, butylpropionate, isopropylbutyrate, ethylbutyrate, butylbutyrate, ethylpyruvate, γ-butyrolacetate, methyl alcohol, ethyl alcohol, n-propyl alcohol, isopropyl alcohol, benzene, toluene, xylene, n-heptane, n-hexane, or n-octane, and they may be used alone or in a combination thereof.

The solvent may be included at a content of about 40 wt % to about 90 wt %, based on the total 100 wt % content of the ink composition. That is to say, a total concentration of the solids in the ink composition may be in a range of about 10 wt % to about 60 wt %, and the concentration of the solids may be varied according to concentrations of the components other than the solvent. When the content of the solvent is less than 40 wt %, a coating property may be deteriorated due to a high content of the solids and a highly increased viscosity, whereas, when the content of the solvent exceeds 90 wt %, a coating process may be hardly performed due to an excessively low content of the solids, and a large amount of a solvent to be dried is not desirable in terms of a process.

The ink composition including the above-described components may further include at least one additive selected from the group consisting of a surfactant, an adhesion promoter, an antioxidant, a pigment dispersant, a leveling agent and a hardener. For example, the surfactant may include a silicon-based surfactant or a fluorine-based surfactant; the pigment dispersant may include polymeric, non-ionic, negative ionic or positive ionic dispersants; the adhesion promoter may include vinyltrimethoxysilane, vinyltriethoxysilane, vinyltris(2-methoxyethoxy)-silane, N-(2-aminoethyl)-3-aminopropylmethyldimethoxysilane, N-(2-aminoethyl)-3-aminopropylmethyltrimethoxysilane, 3-aminopropyltriethoxysilane, 3-glycidoxypropyltriethoxysilane, 3-glycidoxypropylmethyldimethoxysilane, 2-(3,4-ethoxycyclohexyl)ethyltrimethoxysilane, 3-chloropropylmethyldimethoxysilane, 3-chloropropyltrimethoxysilane, 3-methacryloxypropyltrimethoxysilane or 3-mercaptopropyltrimethoxysilane; and the antioxidant may include 2,2-thiobis(4-methyl-6-t-butylphenol) or 2,6-g,t-butylphenol. They may be used alone or in a combination thereof.

The additive may be included at a content of about 0.1 wt % to about 25 wt %, based on the total 100 wt % solid content of the ink composition.

A method of preparing an ink composition is not particularly limited, but the ink composition may, for example, be prepared by adding a coloring agent to a solvent and mixing a binder resin, a multifunctional monomer having an ethylenic unsaturated double bond and a polymerization initiator. The coloring agent may be present in the solvent in a dissolved or dispersed state, and the additive may be previously added to the solvent with the coloring agent when the additive is in a liquid state.

Such an ink composition of the first exemplary embodiments of the present invention is suitable for being applied to a roll printing method, and when the ink composition is particularly applied to a reversed printing method, the adherence may be improved due to the excellent adhesion property between the printing member and the ink composition, thereby forming a micropattern with excellent precision. Also, the improvement of the adhesion property allows the chemical resistance to be improved in subsequent processes.

The ink composition according to a second exemplary embodiment of the present invention is characterized in that it includes a copolymer of compounds represented by the following Formula 3a and Formula 3b, a multifunctional monomer having an ethylenic unsaturated double bond, a coloring agent, a polymerization initiator of Formula 1 described in the first exemplary embodiment of the present invention, and a solvent:

[Formula 3]

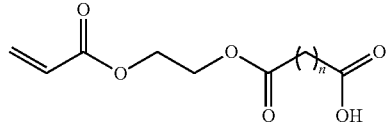
(a)

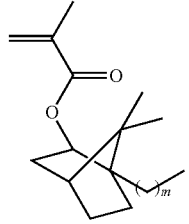
(b)

wherein n is an integer ranging from 2 to 4, and m is an integer ranging from 0 to 2.

In Formula 1, $R_1$, $R_2$ and $R_3$ are each independently hydrogen, halogen, a linear, branched or cyclic alkyl group having 1 to 18 substituted or unsubstituted carbon atoms, a linear, branched or cyclic alkoxy group having 1 to 18 substituted or unsubstituted carbon atoms, an alkylcarbonyl group having 2 to 18 substituted or unsubstituted carbon atoms, an alkoxycarbonyl group having 2 to 18 substituted or unsubstituted carbon atoms, a carboxyl group, a mercapto group, a cyano group, a hydroxyl group, a nitro group, a substituted or unsubstituted phenyl group, a substituted or unsubstituted benzyl group, or a substituted or unsubstituted naphthyl group. $X^-$ is selected from the group consisting of a halogen ion, $OH^-$, $ClO_4^-$, a sulfonate ion, a sulfate ion, a carbonate ion, a phosphate ion, a fluorophosphate ion, a borate ion, $AlCl_4^-$, $BiF_6^-$, a fluoroantimony ion and a fluoroarsenic ion.

The compound of Formula 3a may include acryloxyethylsuccinates, for example, 4-(2-(acryloyloxy)ethoxy)-4-oxobutanoic acid, 5-(2-(acryloyloxy)ethoxy)-5-oxopentanoic acid, or 6-(2-(acryloyloxy)ethoxy)-6-oxohexanoic acid, and they may be used alone or in a combination thereof.

The compound of Formula 3a may be included at a content of about 10 wt % to about 90 wt %, based on the total content of the compounds, i.e., the total 100 wt % content of the compounds (monomers) used for preparation of the copolymer. When the content of the compound is less than 10 wt %, an adhesion property between the ink composition and the printing member is hardly improved and a residual film may be formed, whereas, when the content exceeds 90 wt %, a coating property may be deteriorated.

The compound of Formula 3b may include isobornylmethacrylates, for example 1, 7,7-trimethylbicyclo[2.2.1]heptan-2-yl methacrylate, 7,7-dimethyl-1-propylbicyclo[2.2.1]heptan-2-yl methacrylate, 1-ethyl-7,7-dimethylbicyclo[2.2.1]heptan-2-yl methacrylate, or 1-ethyl-7,7-dimethylbicyclo[2.2.1]heptan-2-yl methacrylate, and they may be used alone or in a combination thereof.

The compound of Formula 3b may be included at a content of 10 to 90 wt %, based on the total 100 wt % content of the copolymer. When the content of the compound is less than about 10 wt %, an adhesion property between the ink composition and the printing member is not good, whereas, when the content exceeds about 90 wt %, an adhesion property may be highly deteriorated, which makes it difficult to form a pattern using a roll printing method, for example, a reversed printing method.

Also, the copolymer may further include a compound copolymerizable with the compounds of Formulas 3a and 3b and having an unsaturated bond, in addition to the compounds of Formulas 3a and 3b.

The kinds of the compound having an unsaturated bond are not particularly limited, and specific examples of the compound may include a carboxylic acid compound such as a monocarboxylic acid including acrylic acid, methacrylic acid or crotonic acid, a dicarboxylic acid including fumaric acid, metaconic acid or itaconic acid, or an anhydride thereof; an unsaturated carboxylic acid ester compound such as methyl (meth)acrylate, ethyl(meth)acrylate, butyl(meth)acrylate, or 2-hydroxyethyl(meth)acrylate; an unsubstituted or substituted alkylester compound of unsaturated carboxylic acid, such as aminoethyl(meth)acrylate; an unsaturated carboxylic acid ester compound containing an alicyclic substituent, such as cyclopentyl(meth)acrylate, cyclohexyl(meth)acrylate, methylcyclohexyl(meth)acrylate, cycloheptyl(meth)acrylate, cyclooctyl(meth)acrylate, cyclopentenyl(meth)acrylate, cyclohexenyl(meth)acrylate, cycloheptenyl(meth)acrylate, cyclooctenyl(meth)acrylate, isobornyl(meth)acrylate, adamantyl(meth)acrylate, or norbornyl(meth)acrylate; an unsaturated carboxylic acid ester compound containing a thermally curable substituent, such as 3-methyl-3-(meth)acryloxymethyloxetane, 3-ethyl-3-(meth)acryloxymethyloxetane, or 3-methyl-3-(meth)acryloxyethyloxetane; an unsaturated glycidyl carboxylic acid ester compound such as glycidyl(meth)acrylate; an unsaturated carboxylic acid ester compound containing a substituent having an aromatic ring, such as benzyl(meth)acrylate or phenoxy(meth)acrylate; an aromatic vinyl compound such as styrene, vinyl toluene or α-methylstyrene; a carboxylic acid vinylester such as vinyl acetate or vinyl propionate; a cyanic vinyl compound such as (meth)acrylonitrile or α-chloroacrylonitrile; or a maleimide compound such as N-cyclohexylmaleimide or N-phenylmaleimide. They may be used alone or in a combination thereof.

The compound having an unsaturated bond may be included at a content of about 20 wt % to about 80 wt %, based on the total 100 wt % content of the copolymer.

A method of preparing a copolymer is not particularly limited, and the copolymer may be prepared using a method widely used in the art, such as bulk polymerization, solution polymerization, emulsion polymerization or suspension polymerization.

The copolymer may be included at a content of about 5 wt % to about 50 wt %, based on the total 100 wt % solid content of the ink composition. In this content range, since the copolymer serves to support a pattern and enhance a pattern transfer rate and also effectively improve an adhesion property between the ink composition and the printing member, a precise micropattern may be formed.

The multifunctional monomer having an ethylenic unsaturated double bond is a component to increase a strength of the pattern, and may include a multifunctional monomer such as polyethyleneglycolmono(meth)acrylate, polypropyleneglycolmono(meth)acrylate or phenoxyethyl(meth)acrylate; or a multifunctional monomer such as polyethyleneglycol(meth)acrylate, polypropyleneglycol(meth)acrylate, trimethylolethanetriacrylate, trimethylolpropanetriacrylate, neopentylglycol(meth)acrylate, pentaerythritoltetraacrylate, pentaerythritoltriacrylate, dipentaerythritolpentaacrylate or dipentaerythritolhexaacrylate. As the caprolactone-grafted multifunctional monomer, KAYARAD DPCA-20, 30, 60 and 120 engrafted to dipentaerythritol, KAYARAD TC-110S engrafted to tetrahydrofurylacrylate, or KAYARAD HX-220 and KAYARAD HK-620 engrafted to neopentylglycol hydroxyl pivalate may also be used. Also, U-324A, U15HA or U-4HA may be used as epoxyacrylate, novolak-epoxyacrylate or urethane-based multifunctional acrylate of the bisphenol A derivative. They may be used alone or in a combination thereof.

The multifunctional monomer having an ethylenic unsaturated double bond may be included at a content of about 10 wt % to about 50 wt %, based on the total 100 wt % solid content of the ink composition.

When the content of the multifunctional monomer is less than 10 wt %, the strength of the pattern may be deteriorated, whereas when the content exceeds 50 wt %, the strength of the pattern may be deteriorated due to the excessive adherence of the solids.

The coloring agent may be an organic coloring agent such as a pigment, a dye, or a synthetic or natural coloring agent, or an inorganic coloring agent such as a metal oxide, a metal complex, or barium sulfate (a body pigment).

When the ink composition of the second exemplary embodiments of the present invention is used for a color filter layer, compounds classified into a pigment and a dye may be used as the coloring agent within a color index (The Society of Dyers and Colourists), and they may be used alone or in a combination thereof.

Specific examples of the pigment may include C.I. Pigment Yellow 1, C.I. Pigment Yellow 12, C.I. Pigment Yellow 13, C.I. Pigment Yellow 14, C.I. Pigment Yellow 15, C.I. Pigment Yellow 16, C.I. Pigment Yellow 17, C.I. Pigment Yellow 20, C.I. Pigment Yellow 24, C.I. Pigment Yellow 31, C.I. Pigment Yellow 53, C.I. Pigment Yellow 83, C.I. Pigment Yellow 86, C.I. Pigment Yellow 93, C.I. Pigment Yellow 94, C.I. Pigment Yellow 109, C.I. Pigment Yellow 110, C.I. Pigment Yellow 117, C.I. Pigment Yellow 125, C.I. Pigment Yellow 128, C.I. Pigment Yellow 137, C.I. Pigment Yellow 138, C.I. Pigment Yellow 139, C.I. Pigment Yellow 147, C.I. Pigment Yellow 148, C.I. Pigment Yellow 150, C.I. Pigment Yellow 153, C.I. Pigment Yellow 154, C.I. Pigment Yellow 166, C.I. Pigment Yellow 173; C.I. Pigment Orange 13, C.I. Pigment Orange 31, C.I. Pigment Orange 36, C.I. Pigment Orange 38, C.I. Pigment Orange 40, C.I. Pigment Orange 42, C.I. Pigment Orange 43, C.I. Pigment Orange 51, C.I. Pigment Orange 55, C.I. Pigment Orange 59, C.I. Pigment Orange 61, C.I. Pigment Orange 64, C.I. Pigment Orange 65, C.I. Pigment Orange 71, C.I. Pigment Orange 73; C.I. Pigment Red 9, C.I. Pigment Red 97, C.I. Pigment Red 105, C.I. Pigment Red 122, C.I. Pigment Red 123, C.I. Pigment Red 144, C.I. Pigment Red 149, C.I. Pigment Red 166, C.I. Pigment Red 168, C.I. Pigment Red 176, C.I. Pigment Red 177, C.I. Pigment Red 180, C.I. Pigment Red 192, C.I. Pigment Red 215, C.I. Pigment Red 216, C.I. Pigment Red 224, C.I. Pigment Red 242, C.I. Pigment Red 254, C.I. Pigment Red 264, C.I. Pigment Red 265; C.I. Pigment Blue 15, C.I. Pigment Blue 15:3, C.I. Pigment Blue 15:4, C.I. Pigment Blue 15:6, C.I. Pigment Blue 60; C.I. Pigment Purple 1, C.I. Pigment Purple 19, C.I. Pigment Purple 23, C.I Pigment Purple 29, C.I Pigment Purple 32, C.I Pigment Purple 36, C.I Pigment Purple 38; C.I. Pigment Green 7, C.I. Pigment Green 36; C.I. Pigment Brown 23, and C.I. Pigment Brown 25. These pigments may be subjected to a process such as rosin treatment, surface treatment using an acidic or basic group-grafted pigment derivative, surface grafting using a polymeric compound, microgranulation using sulfuric acid, or washing using an organic solvent or water, when necessary.

Specific examples of the dye may include C.I. Solvent Yellow 2, C.I. Solvent Yellow 14, C.I. Solvent Yellow 16, C.I. Solvent Yellow 33, C.I. Solvent Yellow 34, C.I. Solvent Yellow 44, C.I. Solvent Yellow 56, C.I. Solvent Yellow 82, C.I.

Solvent Yellow 93, C.I. Solvent Yellow 94, C.I. Solvent Yellow 98, C.I. Solvent Yellow 116, C.I. Solvent Yellow 135; C.I. Solvent Orange 1, C.I. Solvent Orange 3, C.I. Solvent Orange 7, C.I. Solvent Orange 63; C.I. Solvent Red 1, C.I. Solvent Red 2, C.I. Solvent Red 3, C.I. Solvent Red 8, C.I. Solvent Red 18, C.I. Solvent Red 23, C.I. Solvent Red 24, C.I. Solvent Red 27, C.I. Solvent Red 35, C.I. Solvent Red 43, C.I. Solvent Red 45, C.I. Solvent Red 48, C.I. Solvent Red 49, C.I. Solvent Red 91:1, C.I. Solvent Red 119, C.I. Solvent Red 135, C.I. Solvent Red 140, C.I. Solvent Red 196, C.I. Solvent Red 197; C.I. Solvent Purple 8, C.I. Solvent Purple 9, C.I. Solvent Purple 13, C.I. Solvent Purple 26, C.I. Solvent Purple 28, C.I. Solvent Purple 31, C.I. Solvent Purple 59; C.I. Solvent Blue 4, C.I. Solvent Blue 5, C.I. Solvent Blue 25, C.I. Solvent Blue 35, C.I. Solvent Blue 36, C.I. Solvent Blue 38, C.I. Solvent Blue 70; C.I. Solvent Green 3, C.I. Solvent Green 5, and C.I. Solvent Green 7.

Also, when the ink composition of the second exemplary embodiments of the present invention is used for a black matrix, the coloring agent may include a black pigment.

A black pigment having a light-shielding property may be used as the black pigment with no particular limitation, and may include aniline black, perylene black, titanium black or carbon black, and they may be used alone or in a combination thereof.

Also, a pigment for color correction may be used with the black pigment, and specific examples of the pigment may include water-soluble azo-based, insoluble azo-based, phthalocyanine-based, quinacridone-based, isoindolidone-based, isoindoline-based, perylene-based, perinone-based, dioxazine-based, anthraquinone-based, dianthraquinonyl-based, anthrapyrimidine-based, anthanthrone-based, indanthrone-based, flavanthrone-based, pyranthrone-based, and diketopyrrolopyrrole-based pigments.

The content of the coloring agent may be adjusted according to desired color characteristics, and the coloring agent may be included at a content of about 5 wt % to about 70 wt %, based on the total 100 wt % solid content of the ink composition.

The ink composition of the second exemplary embodiments of the present invention is characterized in that a thermal polymerization initiator represented by the following Formula 1 containing a sulfonium positive ion particularly selected from onia and a counter ion thereof may be particularly selected and used as the polymerization initiator with the copolymers of Formulas 3a and 3b so as to improve an adhesion property to a printing member. Since such a polymerization initiator has a better temporal stability and a better shrinkage ratio than the other kinds of polymerization initiators, for example, azo-based initiators, the adhesion between the ink composition and the printing member may be improved. Also, the polymerization initiator has an excellent coating property of the ink composition, compared to polymerization initiators containing the other kinds of onium positive ions, for example, iodonium, and may enhance resolution and sensitivity and simultaneously improve an adhesion property.

In this regard, a precise pattern may be formed with an increase in adherence, and the chemical resistance may be improved in subsequent processes.

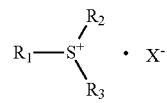

[Formula 1]

wherein $R_1$, $R_2$ and $R_3$ are each independently hydrogen, halogen, a linear, branched or cyclic alkyl group having 1 to 18 saturated or unsaturated carbon atoms, a linear, branched or cyclic alkoxy group having 1 to 18 saturated or unsaturated carbon atoms, an alkylcarbonyl group having 2 to 18 saturated or unsaturated carbon atoms, an alkoxycarbonyl group having 2 to 18 saturated or unsaturated carbon atoms, a carboxyl group, a mercapto group, a cyano group, a hydroxyl group, a nitro group, a saturated or unsaturated phenyl group, a saturated or unsaturated benzyl group, or a saturated or unsaturated naphthyl group, and $X^-$ is selected from the group consisting of a halogen ion, $OH^-$, $ClO_4^-$, a sulfonate ion, a sulfate ion, a carbonate ion, a phosphate ion, a fluorophosphate ion, a borate ion, $AlCl_4^-$, $BiF_6^-$, a fluoroantimony ion and a fluoroarsenic ion.

The polymerization initiator may be in a range of about 0.1 wt % to about 12 wt %, for example, about 0.1 wt % to about 10 wt %, and as a further example, about 0.8 wt % to about 6.5 wt %, based on the total 100 wt % solid content of the ink composition. When the content is less than 0.1 wt %, a polymerization degree may be low and an adhesion property may be hardly improved, whereas, when the content exceeds 12 wt %, a polymerization efficiency may be deteriorated and a coating property may be poor. However, when the content is within this range, a suitable polymerization degree and coating property may be secured, and an adhesion property to the printing member may also be effectively improved.

The solvent may be included at a content of about 30 wt % to about 90 wt %, based on the total 100 wt % content of the ink composition. That is to say, a total concentration of the solids in the ink composition may be in a range of about 10 wt % to about 70 wt %, and the concentration of the solids may be varied according to concentrations of the components other than the solvent. When the content of the solvent is less than about 30 wt %, a coating property may be deteriorated due to a high content of the solids and a highly increased viscosity, whereas, when the content of the solvent exceeds about 90 wt %, a coating process may be hardly performed due to an excessively low content of the solids, and a large amount of a solvent to be dried is not desirable in terms of a process.

Non-conflicting details of the ink composition according to the first exemplary embodiment of the present invention may be applied to the second exemplary embodiment of the present invention.

The method of forming a pattern according to the exemplary embodiments of the present invention is characterized in that the ink composition of the exemplary embodiments of the present invention is used as the ink composition used for a reversed printing method.

As shown in FIG. 1, the method of forming a pattern includes preparing a substrate having a reversed pattern with respect to a desired pattern; applying an ink composition exemplary embodiments of the present invention to a surface of a blanket; pressing the blanket, to which the ink composition is applied, to a substrate to remove the ink composition applied to a region of the reversed pattern from the surface of the blanket; and transferring the ink composition remaining in the surface of the blanket to a printing member.

More particularly, a substrate 15 having a reversed pattern with respect to a desired pattern in a convex shape (a convex portion 14) is prepared. An ink composition 11 is applied to a surface of a blanket 10 using a slit die coater 13. An ink-coated surface 12 in the surface of the blanket 10 is pressed to the substrate 15 to remove the ink composition applied to the convex portion 14 which is a reversed pattern region with respect to the desired pattern. Thereafter, the ink composition 11 having a desired pattern remaining in the blanket 10 is transferred to the printing member 16. In this case, although the slit application is exemplified as the method of applying ink, a method such as spin application or roller application may be used as the method of applying ink, but the present invention is not particularly limited thereto.

The ink applied to the surface of the blanket 10 may have a viscosity of about 1 cPs to about 11 cPs. When the viscosity of the ink is less than 1 cPs, the ink may flow through a slit nozzle before coating due to low viscosity, and it is difficult to achieve a uniform coating property since the range is out of electronic/mechanical control. Meanwhile, when the viscosity of the ink exceeds 11 cPs, it is difficult to spray the ink through a nozzle due to high viscosity, and it is difficult to achieve uniform spraying between nozzles under high-pressure electronic/mechanical control.

An ink contact angle between the ink and the blanket 10 may be in a range of 40° or less after one second of the contact with the surface of the blanket 10 to 35° or less after 10 seconds of the contact with the surface of the blanket 10. When the ink contact angle is 40° or more, an interlumping force in the ink is increased due to an unstable surface tension between the ink and the blanket, which makes it difficult to maintain the coating uniformity.

A surface tension of the ink in a liquid phase itself may be less than about 22 dyne/cm. When the surface tension of the ink in a liquid phase itself exceeds 22 dyne/cm, the coating may not be performed due to the interlumping in the liquid ink at a surface tension equal to or higher than a general surface tension (22-24 dyne/cm) of the blanket 10.

Then, since the blanket 10 may be formed of a silicon pad, a solvent is absorbed into the blanket during the coating of the ink, which leads to swelling of the blanket with time. The dryness and stickiness of the ink may be varied according to such a swelling ratio, and affect a pattern shape after the final pattern transfer. According to the exemplary embodiment, the swelling ratio may be in a range of about 0.6 to about 1.1. When the swelling ratio is less than 0.6, a standby time to the next process is long due to the slow drying of the solvent, and thus stains may be caused because it is difficult to maintain the uniform volatility. When the swelling ratio exceeds 1.1, the coated ink is excessively dried before the next process due to fast volatility of the solvent, which makes it difficult to smoothly transfer a pattern. The swelling ratio may be represented by an absorption of a blanket with respect to the ink.

Also, the ink composition transferred after a transfer process may be baked and cured at a temperature of 150 to 250° C. for 5 to 60 minutes.

The color filter of an exemplary embodiment of the present invention includes a transparent substrate, a color filter layer formed on the transparent substrate, and a black matrix. Here, the color filter layer or the black matrix may be formed of the ink composition according to to an exemplary embodiment of the present invention. The ink composition according to the second exemplary embodiment of the present invention may be better as applied to a black matrix since such an ink composition has excellent temporal stability and printing property to the black pigment.

A material of the transparent substrate is not particularly limited, and, for example, may include a glass substrate, a plastic substrate or other rigid or flexible substrates. Among these, a transparent glass substrate having a strong heat resistance may be used.

Such a color filter is characterized in that it is prepared using the ink composition of the exemplary embodiments of the present invention and the exemplary embodiment of the method of forming a pattern.

More particularly, the color filter may be prepared by forming a black matrix pattern on a transparent substrate and forming a color filter layer with the ink composition according to an exemplary embodiment of the present invention using a reversed printing method. Also, the color filter may be prepared by applying the ink composition according to an exemplary embodiment of the present invention onto a transparent substrate to form a black matrix using a reversed printing method and forming a color filter layer on the black matrix. Furthermore, a color filter may be prepared by applying the ink composition according to an exemplary embodiment of the present invention onto a transparent substrate to form a black matrix using a reversed printing method and forming a color filter layer with the ink composition according to an exemplary embodiment of the present invention using the reversed printing method.

The color filter layer and the black matrix may be formed using photolithography, which is widely known in the art, or a roll printing method (e.g., a reversed printing method) according to the exemplary embodiments of the present invention, and the color filter may be prepared by forming color filter layers on pixel units partitioned by the formed black matrix.

Hereinafter, although exemplary embodiments will be described in relation to specific examples to promote better understanding of the present invention, it will be apparent to a person of ordinary skill in the art that these examples of exemplary embodiments are intended to exemplify the present invention, but not to limit the present invention to these examples of exemplary embodiments.

Example A, to be described below, corresponds to the above-described example of the first exemplary embodiment of the present invention, and Example B corresponds to the example of the second exemplary embodiment of the present invention.

EXAMPLE A

EXAMPLE 1

An ink composition was prepared by mixing 29.68 wt % of a coloring agent obtained by mixing C. I. Pigment Blue 15:6 and C. I. Pigment Purple 23 at a ratio of 9:1, 21.64 wt % of a copolymer (SPCY-22L, Showa Polymer Process Corp.: weight average molecular weight of 9,500) of compounds (including methacrylic acid and benzylmethacrylate) of Formulas 2a to 2d, 27.82 wt % of dipentaerythritolhexaacrylate (DPHA), 1.36 wt % of a polymerization initiator (SI-100L, SANSHIN Chemical Industry) containing a benzylmethyl(4-hydroxyphenyl)sulfonium positive ion, and 19.50 wt % of an additive including a fluorine-based surfactant (DAINIPPON INK & CHEMICALS) and a dispersant (based on the total 100 wt % solid content) with 57 wt % of a mixed solvent of propyleneglycol monomethyl ether and propyleneglycol monomethyl ether acetate (based on the total 100 wt % content of the composition).

EXAMPLE 2

An ink composition was prepared in the same manner as in Example 1, except that 29.28 wt % of the coloring agent, 21.35 wt % of the copolymer (SPCY-22L), 27.44 wt % of DPHA, 2.68 wt % of the polymerization initiator (SI-100L) and 19.25 wt % of the additive were used, based on the total 100 wt % solid content, and the mixed solvent was used at a content of 57 wt %, based on the total content of the composition.

EXAMPLE 3

An ink composition was prepared in the same manner as in Example 1, except that 28.52 wt % of the coloring agent, 20.80 wt % of the copolymer (SPCY-22L), 26.73 wt % of DPHA, 5.22 wt % of the polymerization initiator (SI-100L) and 18.73 wt % of the additive were used, based on the total 100 wt % solid content, and the mixed solvent was used at a content of 57 wt %, based on the total content of the composition.

EXAMPLE 4

An ink composition was prepared in the same manner as in Example 1, except that 29.28 wt % of the coloring agent, 21.35 wt % of the copolymer (SPCY-22L), 27.44 wt % of DPHA, 2.68 wt % of a polymerization initiator (SP-172, SANSHIN Chemical Industry) containing a triphenylsulfonium positive ion, and 19.25 wt % of the additive were used, based on the total 100 wt % solid content, and the mixed solvent was used at a content of 57 wt %, based on the total content of the composition.

EXAMPLE 5

An ink composition was prepared in the same manner as in Example 1, except that 27.27 wt % of the coloring agent, 19.89 wt % of the copolymer (SPCY-22L), 25.56 wt % of DPHA, 9.35 wt % of the polymerization initiator (SI-100L), and 17.93 wt % of the additive were used, based on the total 100 wt % solid content, and the mixed solvent was used at a content of 57 wt %, based on the total content of the composition.

EXAMPLE 6

An ink composition was prepared in the same manner as in Example 1, except that 29.98 wt % of the coloring agent, 21.86 wt % of the copolymer (SPCY-22L), 28.10 wt % of DPHA, 0.34 wt % of the polymerization initiator (SI-100L), and 19.72 wt % of the additive were used, based on the total 100 wt % solid content, and the mixed solvent was used at a content of 57 wt %, based on the total content of the composition.

EXAMPLE 7

An ink composition was prepared in the same manner as in Example 1, except that 26.45 wt % of the coloring agent, 19.29 wt % of the copolymer (SPCY-22L), 24.79 wt % of DPHA, 12.09 wt % of the polymerization initiator (SI-100L), and 17.38 wt % of the additive were used, based on the total 100 wt % solid content, and the mixed solvent was used at a content of 57 wt %, based on the total content of the composition.

COMPARATIVE EXAMPLE 1

An ink composition was prepared in the same manner as in Example 1, except that 29.29 wt % of the coloring agent, 21.35 wt % of the copolymer (SPCY-22L), 27.44 wt % of DPHA, 2.68 wt % of an azoamide-based polymerization initiator (Vam-110, Wako Pure Chemical Industries. LTD), and 19.25 wt % of the additive were used, based on the total 100 wt % solid content, and the mixed solvent was used at a content of 57 wt %, based on the total content of the composition.

COMPARATIVE EXAMPLE 2

An ink composition was prepared in the same manner as in Example 1, except that 30.09 wt % of the coloring agent, 21.94 wt % of the copolymer (SPCY-22L), 28.20 wt % of DPHA, and 19.77 wt % of the additive were used, based on the total 100 wt % solid content, and the mixed solvent was used at a content of 57 wt %, based on the total content of the composition.

COMPARATIVE EXAMPLE 3

An ink composition was prepared in the same manner as in Example 1, except that 29.98 wt % of the coloring agent, 21.35 wt % of the copolymer (SPCY-22L), 27.44 wt % of DPHA, 2.68 wt % of a polymerization initiator (SP-201, SMC) containing an iodonium positive ion, and 19.25 wt % of the additive were used, based on the total 100 wt % solid content, and the mixed solvent was used at a content of 57 wt %, based on the total content of the composition.

The components and contents of the ink compositions prepared in Examples and Comparative Examples are listed in the following Table 1.

TABLE 1

| | Solids (wt %) | | | | | | | | Solvent |
|---|---|---|---|---|---|---|---|---|---|
| | Coloring agent | Co-polymer | DPHA | \multicolumn{4}{c}{Polymerization initiator} | Additive | (wt %) |
| | | | | I | II | III | IV | | |
| Example 1 | 29.68 | 21.64 | 27.82 | 1.36 | — | — | — | 19.50 | 57 |
| Example 2 | 29.28 | 21.35 | 27.44 | 2.68 | — | — | — | 19.25 | 57 |
| Example 3 | 28.52 | 20.80 | 26.73 | 5.22 | — | — | — | 18.73 | 57 |
| Example 4 | 29.28 | 21.35 | 27.44 | — | 2.68 | — | — | 19.25 | 57 |
| Example 5 | 27.27 | 19.89 | 25.56 | 9.35 | — | — | — | 17.93 | 57 |
| Example 6 | 29.98 | 21.86 | 28.10 | 0.34 | — | — | — | 19.72 | 57 |
| Example 7 | 26.45 | 19.29 | 24.79 | 12.09 | — | — | — | 17.38 | 57 |
| Comparative Example 1 | 29.28 | 21.35 | 27.44 | — | — | 2.68 | — | 19.25 | 57 |

TABLE 1-continued

|  | Solids (wt %) | | | | | | | | Solvent |
|---|---|---|---|---|---|---|---|---|---|
|  | Coloring | Co- | | Polymerization initiator | | | | | |
|  | agent | polymer | DPHA | I | II | III | IV | Additive | (wt %) |
| Comparative Example 2 | 30.09 | 21.94 | 28.20 | — | — | — | — | 19.77 | 57 |
| Comparative Example 3 | 29.28 | 21.35 | 27.44 | — | — | — | 2.68 | 19.25 | 57 |

\* Contents of a coloring agent, a copolymer, DPHA, a polymerization initiator and a surfactant are based on the total 100 wt % solid content, and a content of a solvent is based on the total 100 wt % content of the composition.
Copolymer I: a copolymer (SPCY-22L, Showa Polymer Process Corp.: weight average molecular weight of 9,500) of compounds of Formulas 2a to 2d
DPHA: dipentaerythritolhexaacrylate
Polymerization initiator I: a polymerization initiator (SI-100L, SANSHIN Chemical Industry) containing a benzylmethyl(4-hydroxyphenyl)sulfonium positive ion
Polymerization initiator II: polymerization initiator (SP-172, SANSHIN Chemical Industry) containing a triphenylsulfonium positive ion
Polymerization initiator III: an azoamide-based polymerization initiator (Vam-110, Wako Pure Chemical Industries. LTD)
Polymerization initiator IV: a polymerization initiator (SP-201, SMC) containing an iodonium positive ion
Solvent: propyleneglycol monomethyl ether/propyleneglycol monomethyl ether acetate

EXPERIMENTAL EXAMPLE

The physical properties of the ink compositions prepared in Examples and Comparative Examples were measured using the following method, and the results are listed in the following Table 2.

1. Coating Property

A prepared ink composition was applied onto a glass substrate using a spin coater.

The glass substrate was soft-baked at 100° C. for 120 seconds, kept at room temperature, baked again at 220° C. for 20 minutes, and cured to prepare a coating film.

A height of a coating film rising from each edge of the glass substrate was measured.

<Evaluation Criteria>
◯: A rising height of less than 2 mm (Good)
Δ: A rising height of 2 mm to less than 5 mm (Satisfactory)
x: A rising height of 5 mm or more (Poor)

2. Adhesion Property

A coating film was prepared using the same method as in above Coating Property test, and a tape peel test was then performed according to JIS K5400. Among a total of 100 lattices, the number of remaining lattices was determined. Also, the results of the adhesion test on the coating films formed from the ink compositions of Example 2 and Comparative Example 2 were determined under an optical microscope.

<Evaluation Criteria>
◉: Number of lattices: 100 (Excellent)
◯: Number of lattices: 90 to less than 100 (Good)
Δ: Number of lattices: 80 to less than 90 (Satisfactory)
x: Number of lattices: Less than 80 (Poor)

3. Chemical Resistance

A coating film was prepared using the same method as in above Coating Property test, and the prepared coating film was dipped in each of alkali-resistant (a 5% sodium hydroxide aqueous solution), solvent-resistant (N-methylpyrrolidone, NMP) and peel-resistant (PRS-2000) medicinal fluids. A change in thickness of the coating film before and after the dipping in the medicinal fluid was calculated using the following Equation 1, and the chemical resistance of the coating film was evaluated using the change in thickness.

Change (%) in Thickness of Coating Film=Thickness of Coating Film Before Dipping/Thickness of Coating Film After Dipping×100   (Equation 1)

<Evaluation Criteria>
◉: Change in thickness: 0% (Excellent)
◯: Change in thickness: 0% to less than 2% (Good)
Δ: Change in thickness of 2% to less than 10% (Satisfactory)
x: Change in thickness greater than 10% (Poor)

TABLE 2

|  | Coating Property | Adhesion Property | Chemical Resistance |
|---|---|---|---|
| Example 1 | ◉ | ◯ | ◯ |
| Example 2 | ◉ | ◉ | ◉ |
| Example 3 | ◉ | ◉ | ◉ |
| Example 4 | ◯ | ◉ | ◉ |
| Example 5 | ◯ | ◉ | ◉ |
| Example 6 | ◯ | ◯ | ◯ |
| Example 7 | Δ | ◉ | ◉ |
| Comparatice Example 1 | Δ | Δ | X |
| Comparatice Example 2 | X | X | X |
| Comparatice Example 3 | X | Δ | Δ |

Figure 2:
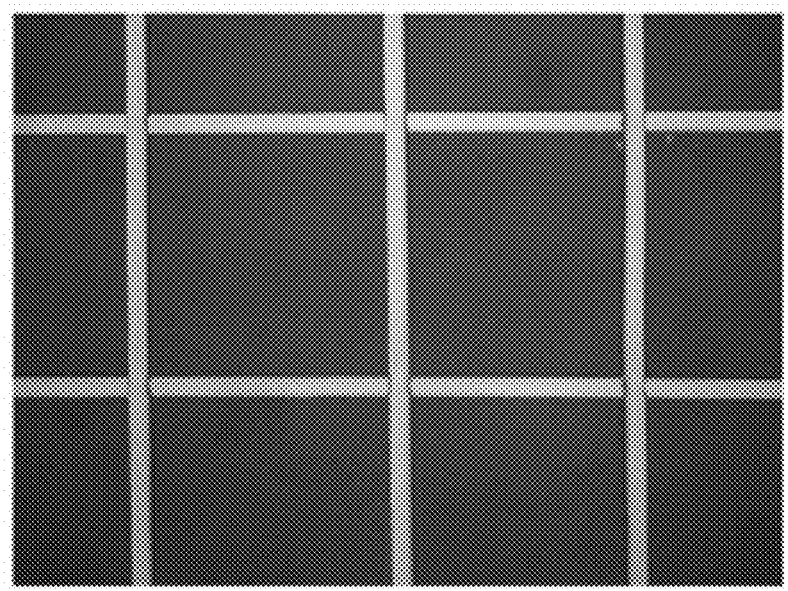
FIG. 2 is an optical microscope photograph showing the results of an adhesion test of a coating film formed from an ink composition of Example 2 according to an exemplary embodiment of the present invention.

As listed in Table 2, it was confirmed that the ink compositions of Examples 1 to 7 using the polymerization initiator of Formula 1 according to exemplary embodiments of the present invention had an excellent adhesion property to a printing member, as well as the coating property and chemical resistance, and thus the peeling of the lattices was hardly observed, as shown in FIG. 2. In particular, when the polymerization initiator of Formula 1 was present at a content of 2.3 to 9.5 wt %, based on the total 100 wt % solid content, an adhesion property was highly improved, resulting in an increase in chemical resistance.

Figure 3:
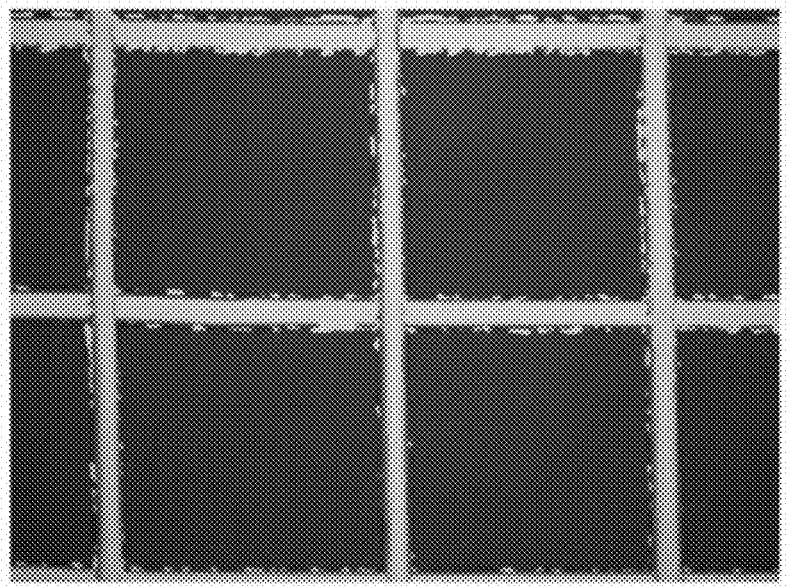
FIG. 3 is an optical microscope photograph showing the results of an adhesion test of a coating film formed from an ink composition of Comparative Example 2 according to an exemplary embodiment of the present invention.

Meanwhile, the ink compositions of Comparative Example 1 using the azo-based polymerization initiator and Comparative Example 2 using no polymerization initiator had a poor adhesion property, and thus the peeling of the lattices was observed, as shown in FIG. 3. Also, the ink composition using the polymerization initiator containing an iodonium positive ion had a poor coating property and the sensitivity and resolution of the ink composition were also inferior to those of Examples 1-7.

EXAMPLE B

PREPARATIVE EXAMPLE 1

Preparation of Copolymer 400 g of propyleneglycol monomethyl ether acetate (PG-MEA), 7 g of 2,2'-s azobisisobutyronitrile (AIBN), 45 g of 6-(2-(acryloyloxy)ethoxy)-6-oxohexanoic acid, 58 g of N-phenylmaleimide, 20 g of styrene, 40 g of methacrylic acid, and 20 g of 7,7-dimethyl-1-propylbicyclo[2.2.1]heptane-2-yl methacrylate were put into a 1,000 ml flask equipped with a stirrer, a thermometer, a reflux condenser, a dropping lot and a nitrogen inlet pipe, and substituted with nitrogen. Thereafter, a reaction solution was heated to a temperature of 100° C. while stirring, and a copolymer was synthesized for 7 hours after the heating. The synthesized copolymer had a weight average molecular weight (Mw, based on styrene) of 12,500, as measured using gel permeation chromatography (GPC).

EXAMPLE 8

An ink composition was prepared by mixing 52.49 wt % of a carbon black coloring agent, which is a black pigment, 10.37 wt % of a copolymer of Preparative Example 1, 20.83 wt % of DPHA, 0.95 wt % of a polymerization initiator (SI-100L, SANSHIN Chemical Industry) containing a benzylmethyl(4-hydroxyphenyl)sulfonium positive ion, and 15.36 wt % of an additive including an adhesion promoter, a surfactant and a dispersant (based on the total 100 wt % solid content) with 47 wt % of a mixed solvent of propyleneglycol monomethyl ether and propyleneglycol monomethyl ether acetate (based on the total 100 wt % content of the composition).

EXAMPLE 9

An ink composition was prepared in the same manner as in Example 8, except that 52.00 wt % of the coloring agent, 10.28 wt % of the copolymer of Preparative Example 1, 20.63 wt % of DPHA, 1.88 wt % of the polymerization initiator (SI-100L) and 15.21 wt % of the additive were used, based on the total 100 wt % solid content, and the mixed solvent was used at a content of 47 wt %, based on the total content of the composition.

EXAMPLE 10

An ink composition was prepared in the same manner as in Example 8, except that 51.05 wt % of the coloring agent, 10.09 wt % of the copolymer of Preparative Example 1, 20.25 wt % of DPHA, 3.68 wt % of the polymerization initiator (SI-100L) and 14.93 wt % of the additive were used, based on the total 100 wt % solid content, and the mixed solvent was used at a content of 47 wt %, based on the total content of the composition.

EXAMPLE 11

An ink composition was prepared in the same manner as in Example 8, except that 52.00 wt % of the coloring agent, 10.28 wt % of the copolymer of Preparative Example 1, 20.63 wt % of DPHA, 1.88 wt % of a polymerization initiator (SP-172, SANSHIN Chemical Industry) containing a triphenylsulfonium positive ion, and 15.21 wt % of the additive were used, based on the total 100 wt % solid content, and the mixed solvent was used at a content of 47 wt %, based on the total content of the composition.

EXAMPLE 12

An ink composition was prepared in the same manner as in Example 8, except that 49.66 wt % of the coloring agent, 9.81 wt % of the copolymer of Preparative Example 1, 19.70 wt % of DPHA, 6.31 wt % of the polymerization initiator (SI-100L), and 14.52 wt % of the additive were used, based on the total 100 wt % solid content, and the mixed solvent was used at a content of 47 wt %, based on the total content of the composition.

EXAMPLE 13

An ink composition was prepared in the same manner as in Example 8, except that 52.87 wt % of the coloring agent, 10.45 wt % of the copolymer of Preparative Example 1, 20.98 wt % of DPHA, 0.24 wt % of the polymerization initiator (SI-100L), and 15.46 wt % of the additive were used, based on the total 100 wt % solid content, and the mixed solvent was used at a content of 47 wt %, based on the total content of the composition.

EXAMPLE 14

An ink composition was prepared in the same manner as in Example 8, except that 48.37 wt % of the coloring agent, 9.56 wt % of the copolymer of Preparative Example 1, 19.19 wt % of DPHA, 8.72 wt % of the polymerization initiator (SI-100L), and 14.16 wt % of the additive were used, based on the total 100 wt % solid content, and the mixed solvent was used at a content of 47 wt %, based on the total content of the composition.

COMPARATIVE EXAMPLE 4

An ink composition was prepared in the same manner as in Example 8, except that 52.00 wt % of the coloring agent, 10.28 wt % of the copolymer of Preparative Example 1, 20.63 wt % of DPHA, 1.88 wt % of an azoamide-based polymerization initiator (Vam-110, Wako Pure Chemical Industries. LTD), and 15.21 wt % of the additive were used, based on the total 100 wt % solid content, and the mixed solvent was used at a content of 47 wt %, based on the total content of the composition.

COMPARATIVE EXAMPLE 5

An ink composition was prepared in the same manner as in Example 8, except that 53.00 wt % of the coloring agent, 10.47 wt % of the copolymer of Preparative Example 1, 21.03 wt % of DPHA, and 15.50 wt % of the additive were used, based on the total 100 wt % solid content, and the mixed solvent was used at a content of 47 wt %, based on the total content of the composition.

COMPARATIVE EXAMPLE 6

An ink composition was prepared in the same manner as in Example 8, except that 52.00 wt % of the coloring agent, 10.28 wt % of the copolymer of Preparative Example 1, 20.63 wt % of DPHA, 1.88 wt % of an azoamide-based polymerization initiator (SP-201, SMC) containing an iodonium positive ion, and 15.21 wt % of the additive were used, based on the total 100 wt % solid content, and the mixed solvent was used at a content of 47 wt %, based on the total content of the composition.

COMPARATIVE EXAMPLE 7

An ink composition was prepared in the same manner as in Example 8, except that 52.00 wt % of the coloring agent, 10.28 wt % of a cardo-based resin (WR-101, Adeka), 20.63 wt % of DPHA, 1.88 wt % of the polymerization initiator (SI-100L), and 15.21 wt % of the additive were used, based on the total 100 wt % solid content, and the mixed solvent was used at a content of 47 wt %, based on the total content of the composition.

The components and contents of the ink compositions prepared in Examples and Comparative Examples are listed in the following Table 3.

TABLE 3

| | Solids (wt %) | | | | | | | | | Solvent |
|---|---|---|---|---|---|---|---|---|---|---|
| | Coloring | Copolymer | | | Polymerization initiator | | | | | |
| | agent | I | II | DPHA | I | II | III | IV | Additive | (wt %) |
| Example 8 | 52.49 | 10.37 | — | 20.83 | 0.95 | — | — | — | 15.36 | 47 |
| Example 9 | 52.00 | 10.28 | — | 20.63 | 1.88 | — | — | — | 15.21 | 47 |
| Example 10 | 51.05 | 10.09 | — | 20.25 | 3.68 | — | — | — | 14.93 | 47 |
| Example 11 | 52.00 | 10.28 | — | 20.63 | — | 1.88 | — | — | 15.21 | 47 |
| Example 12 | 49.66 | 9.81 | — | 19.70 | 6.31 | — | — | — | 14.52 | 47 |
| Example 13 | 52.87 | 10.45 | — | 20.98 | 0.24 | — | — | — | 15.46 | 47 |
| Example 14 | 48.37 | 9.56 | — | 19.19 | 8.72 | — | — | — | 14.16 | 47 |
| Comparative Example 4 | 52.00 | 10.28 | — | 20.63 | — | — | 1.88 | — | 15.21 | 47 |
| Comparative Example 5 | 53.00 | 10.47 | — | 21.03 | — | — | — | — | 15.50 | 47 |
| Comparative Example 6 | 52.00 | 10.28 | — | 20.63 | — | — | — | 1.88 | 15.21 | 47 |
| Comparative Example 7 | 52.00 | — | 10.28 | 20.63 | 1.88 | — | — | — | 15.21 | 47 |

* Contents of a coloring agent, a copolymer, DPHA, a polymerization initiator and a surfactant are based on the total 100 wt % solid content, and a content of a solvent is based on the total 100 wt % content of the composition.
Copolymer I: a copolymer (weight average molecular weight of 12,500) of compounds of Formulas 1a and 1b and a compound having an unsaturated bond
Copolymer II: a cardo-based resin (WR-101, Adeka)
DPHA: dipentaerythritolhexaacrylate
Polymerization initiator I: a polymerization initiator (SI-100L, SANSHIN Chemical Industry) containing a benzylmethyl(4-hydroxyphenyl) sulfonium positive ion
Polymerization initiator II: polymerization initiator (SP-172, SANSHIN Chemical Industry) containing a triphenylsulfonium positive ion
Polymerization initiator III: an azoamide-based polymerization initiator (Vam-110, Wako Pure Chemical Industries. LTD)
Polymerization initiator IV: a polymerization initiator (SP-201, SMC) containing an iodonium positive ion
Solvent: propyleneglycol monomethyl ether/propyleneglycol monomethyl ether acetate

EXPERIMENTAL EXAMPLE

The physical properties of the ink compositions prepared in Examples and Comparative Examples were measured using the following method, and the results are listed in the following Table 4.

1. Coating Property

A prepared ink composition was applied onto a glass substrate using a spin coater.

The glass substrate was soft-baked at 100° C. for 120 seconds, kept at room temperature, baked again at 220° C. for 20 minutes, and cured to prepare a coating film.

A height of a coating film rising from each edge of the glass substrate was measured.

<Evaluation Criteria>
○: A rising height of less than 2 mm (Good)
Δ: A rising height of 2 mm to less than 5 mm (Satisfactory)
x: A rising height of 5 mm or more (Poor)

2. Adhesion Property

A coating film was prepared using the same method as in above Coating Property test, and a tape peel test was then performed according to JIS K5400. Among a total of 100 lattices, the number of remaining lattices was determined. Also, the results of the adhesion test on the coating film formed from the ink composition of Example 9 were determined under an optical microscope.

<Evaluation Criteria>
◉: Number of lattices: 100 (Excellent)
○: Number of lattices: 90 to less than 100 (Good)
Δ: Number of lattices: 80 to less than 90 (Satisfactory)
x: Number of lattices: Less than 80 (Poor)

3. Chemical Resistance

A coating film was prepared using the same method as in above Coating Property test, and the prepared coating film was dipped in each of alkali-resistant (a 5% sodium hydroxide aqueous solution), solvent-resistant (N-methylpyrrolidone, NMP) and peel-resistant (PRS-2000) medicinal fluids. A change in thickness of the coating film before and after the dipping in the medicinal fluid was calculated using the following Equation 1, and the chemical resistance of the coating film was evaluated using the change in thickness.

Change (%) in Thickness of Coating Film=Thickness of Coating Film Before Dipping/Thickness of Coating Film After Dipping×100    (Equation 1)

<Evaluation Criteria>
◉: Change in Thickness: 0% (Excellent)
○: Change in thickness of 0% to less than 2% (Good)
Δ: Change in thickness of 2% to less than 10% (Satisfactory)
x: Change in thickness greater than 10% (Poor)

4. Line-Edge Roughness (LER) Characteristics

The prepared ink composition was applied onto a glass substrate using a reversed printing apparatus. The glass substrate was soft-baked at 100° C. for 120 seconds, kept at room temperature, baked again at 220° C. for 20 minutes, and cured to prepare a coating film.

A precise micropattern, which was formed on the prepared coating film without deformation in a line width and gap of the printed pattern (roughness), was observed with the naked eye using an optical microscope.

That is to say, when the printed pattern is good in shape without any deformation, a desired pattern remaining at a surface of a blanket was proven to be well transferred onto a glass substrate.

<Evaluation Criteria>
○: No deformation in line width and gap of pattern (Excellent)
Δ: Line width and gap of pattern are hardly deformed (Satisfactory)
x: Line width and gap of pattern are deformed (Poor)

TABLE 4

| | Coating Property | Adhesion Property | Chemical Resistance | LER Characteristics |
|---|---|---|---|---|
| Example 8 | ◎ | ○ | ○ | ○ |
| Example 9 | ◎ | ◎ | ◎ | ○ |
| Example 10 | ◎ | ◎ | ◎ | ○ |
| Example 11 | ○ | ◎ | ◎ | ○ |
| Example 12 | ○ | ◎ | ◎ | ○ |
| Example 13 | ○ | ○ | ○ | ○ |
| Example 14 | Δ | ◎ | ◎ | ○ |
| Comparative Example 4 | Δ | Δ | X | Δ |
| Comparative Example 5 | X | X | X | X |
| Comparative Example 7 | X | Δ | Δ | Δ |
| Comparative Example 8 | X | ○ | ○ | X |

Figure 4:
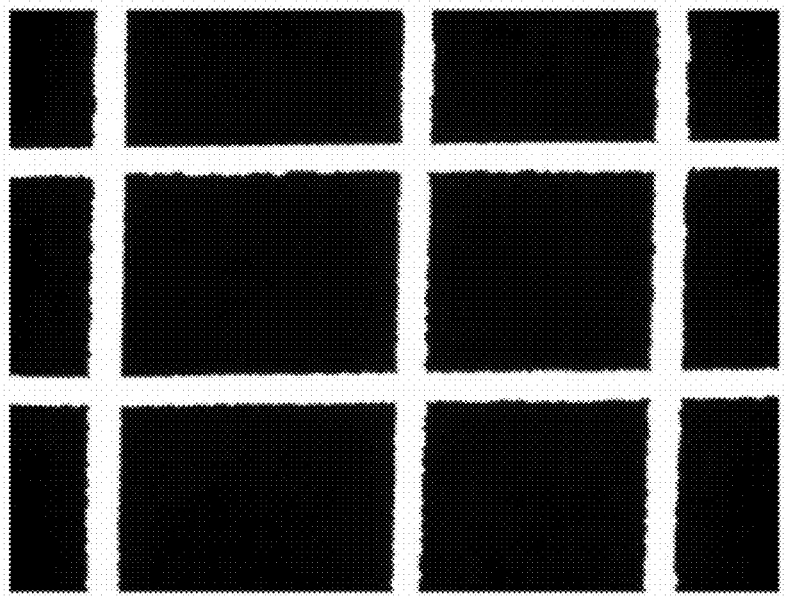
FIG. 4 is an optical microscope photograph showing the results of an adhesion test of a coating film formed from an ink composition of Example 9 according to an exemplary embodiment of the present invention.
Figure 5:
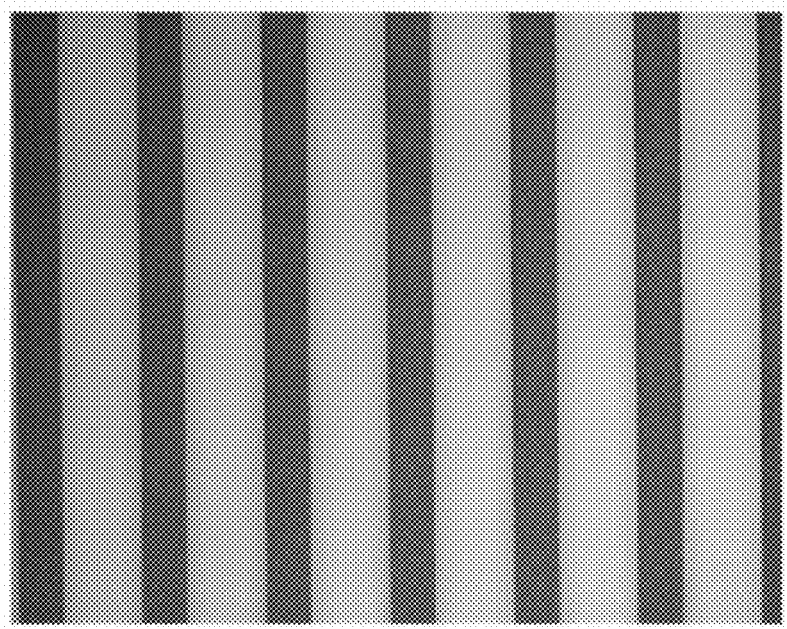
FIG. 5 is an optical microscope photograph showing the results of a pattern precision test of the coating film formed from the ink composition of Example 9.

As listed in Table 4, it was confirmed that, since the ink compositions of Examples 8 to 14 using the compounds of Formulas 3a and 3b and the polymerization initiator of Formula 1 according to exemplary embodiments of the present invention had an excellent adhesion property to a printing member, as well as the coating property and chemical resistance, the lattices were hardly peeled, as shown in FIG. 4, and the ink composition was well transferred to a blanket during reversed printing, as shown in FIG. 5, thereby forming a pattern with high precision without deformation in line width and gap of the pattern.

In particular, when a content of the polymerization initiator of Formula 1 was present at a content of 0.8 to 6.5 wt %, based on the total 100 wt % solid content, the adhesion property was highly improved, resulting in an increase in chemical resistance.

Figure 6:
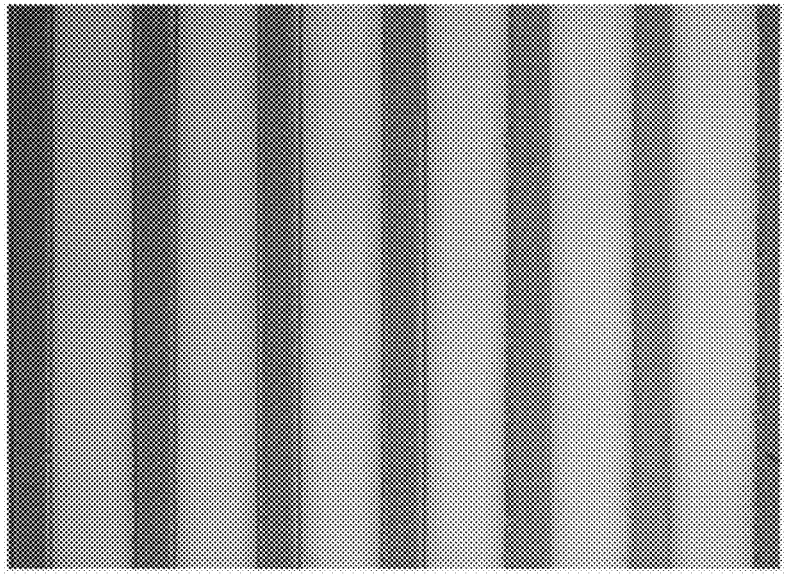
FIG. 6 is an optical microscope photograph showing the results of a pattern precision test of a coating film formed from an ink composition of Comparative Example 7.

Meanwhile, the ink compositions of Comparative Example 4 using the azo-based polymerization initiator, Comparative Example 5 using no polymerization initiator and Comparative Example 6 using the polymerization initiator having an iodonium positive ion had a poor adhesion property, and the ink composition of Comparative Example 7 using the cardo-based resin as the copolymer had a good adhesion property, but defects in pattern caused by the deformation in a line width and gap of the pattern as shown in FIG. 6 were observed.

The ink composition of exemplary embodiments of the present invention is particularly suitable for use in a reversed printing method since the adhesion property to the printing member may be improved to secure strong adherence, and may be used to form a micropattern with high precision.

Also, since the ink composition of exemplary embodiments of the present invention has a good coating property and excellent chemical resistances such as alkali resistance, solvent resistance and peel resistance, a micropattern having no inferiorities such as damage or changes in shape or thickness may be formed.

In addition, the ink composition of exemplary embodiments of the present invention is suitable for preparation of a color filter, particularly a high-quality color filter layer.

According to exemplary embodiments of the present invention, processes are simple since there is no additional exposure process, a production yield may be improved, and it is effective in an aspect of cost.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An ink composition comprising:
    a binder resin comprising a copolymer of monomers represented by the following Formula 3a and Formula 3b:

Formula 3

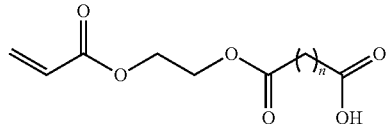

(a)

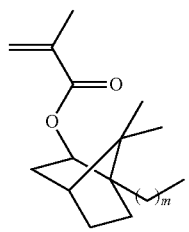

(b)

wherein n is 2, 3, or 4, and m is 0, 1, or 2;
    a multifunctional monomer having an ethylenic unsaturated double bond;
    a coloring agent;
    a solvent; and
    a polymerization initiator represented by the following Formula 1:

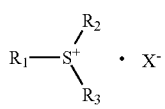

Formula 1 wherein each of $R_1$, $R_2$, and $R_3$ is independently hydrogen, halogen, a linear, branched or cyclic alkyl group having 1 to 18 substituted or unsubstituted carbon atoms, a linear, branched or cyclic alkoxy group having 1 to 18 substituted or unsubstituted carbon atoms, an alkylcarbonyl group having 2 to 18 substituted or unsubstituted carbon atoms, an alkoxycarbonyl group having 2 to 18 substituted or unsubstituted carbon atoms, a carboxyl group, a mercapto group, a cyano group, a hydroxyl group, a nitro group, a substituted or unsubstituted phenyl group, a substituted or unsubstituted benzyl group, or a substituted or unsubstituted naphthyl group; and
    wherein $X^-$ is selected from the group consisting of a halogen ion, $OH^-$, $ClO_2^-$, a sulfonate ion, a sulfate ion, a carbonate ion, a phosphate ion, a fluorophosphate ion, a borate ion, $AlCl_4^-$, $BiF_6^-$, a fluoroantimony ion, and a fluoroarsenic ion.

2. The ink composition of claim 1, wherein the binder resin comprises a copolymer of a monomer having a carboxyl group and a monomer having an unsaturated bond.

3. The ink composition of claim 1, wherein the copolymer is formed of about 10 wt. % to about 90 wt. % of the compound of Formula 3a and about 90 wt. % to about 10 wt. % of the compound of Formula 3b.

4. The ink composition of claim 1, wherein the copolymer further comprises a compound having an unsaturated bond.

5. The ink composition of claim 1, wherein a viscosity of the ink is in a range of about 1 cPs to about 11 cPs.

6. The ink composition of claim 1, wherein a surface tension of the ink is equal to or less than about 22 dyne/cm.

7. The ink composition of claim 1, wherein the ink composition comprises about 5 wt. % to about 50 wt. % of the copolymer, about 10 wt. % to about 50 wt. % of the multifunctional monomer having an ethylenic unsaturated double bond, about 5 wt. % to about 70 wt. % of the coloring agent, and about 0.1 wt. % to about 12 wt. % of the polymerization initiator of Formula 1, based on the total 100 wt. % solid content, and comprising about 30 wt. % to about 90 wt. % of the solvent, based on the total 100 wt. % content of the composition.

8. The ink composition of claim 7, wherein the polymerization initiator of Formula 1 is included at a content of about 0.8 wt. % to about 6.5 wt. %, based on the total 100 wt. % solid content.

9. The ink composition of claim 1, wherein the positive ion of the polymerization initiator of Formula 1 is selected from the group consisting of triphenylsulfonium, tris(4-tolyl)sulfonium, benzylmethyl(4-hydroxyphenyl)sulfonium, benzylmethyl(4-acetoxyphenyl)sulfonium, and methyl(4-hydroxyphenyl)(2-methylphenyl)sulfonium.

10. The ink composition of claim 9, wherein the ink composition comprises about 10 wt. % to about 50 wt. % of the binder resin, about 10 wt. % to about 50 wt. % of the multifunctional monomer having an ethylenic unsaturated double bond, about 5 wt. % to about 60 wt. % of the coloring agent, and about 0.1 wt. % to about 15 wt. % of the polymerization initiator of Formula 1, based on the total 100 wt. % solid content, and comprises about 40 wt. % to about 90 wt. % of the solvent, based on the total 100 wt. % content of the composition.

11. The ink composition of claim 10, wherein the polymerization initiator of Formula 1 is included at a content of about 2.3 wt. % to about 9.5 wt. %, based on the total 100 wt. % solid content.

12. The ink composition of claim 10, further comprising: about 0.1 wt. % to about 25 wt. % of at least one additive selected from the group consisting of a surfactant, an adhesion promoter, an antioxidant, a pigment dispersant, a leveling agent and a hardener, based on the total 100 wt. % solid content.

13. An ink composition comprising:
a binder resin comprising a copolymer of monomers represented by the following Formula 2a, Formula 2b, Formula 2c, and Formula 2d:

Formula 2

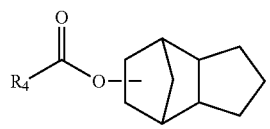
(a)

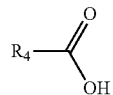
(b)

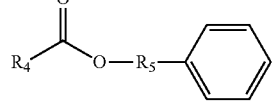
(c)

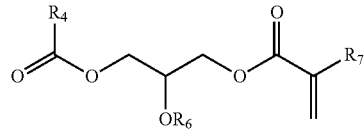
(d)

wherein $R_4$ is hydrogen, an alkyl group having 1 to 6 substituted or unsubstituted carbon atoms, or an alkenyl group having 2 to 6 substituted or unsubstituted carbon atoms; $R_5$ is an alkyl group having 1 to 6 substituted or unsubstituted carbon atoms, or an alkenyl group having 2 to 6 substituted or unsubstituted carbon atoms; and $R_6$ and $R_7$ are each independently hydrogen or an alkyl group having 1 to 6 carbon atoms;

a multifunctional monomer having an ethylenic unsaturated double bond; a coloring agent;

a solvent; and a polymerization initiator represented by the following Formula 1:

Formula 1

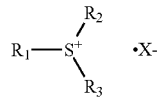

wherein each of $R_1$, $R_2$, and $R_3$ is independently hydrogen, halogen, a linear, branched or cyclic alkyl group having 1 to 18 substituted or unsubstituted carbon atoms, a linear, branched or cyclic alkoxy group having 1 to 18 substituted or unsubstituted carbon atoms, an alkylcarbonyl group having 2 to 18 substituted or unsubstituted carbon atoms, an alkoxycarbonyl group having 2 to 18 substituted or unsubstituted carbon atoms, a carboxyl group, a mercapto group, a cyano group, a hydroxyl group, a nitro group, a substituted or unsubstituted phenyl group, a substituted or unsubstituted benzyl group, or a substituted or unsubstituted naphthyl group; and wherein $X^-$ is selected from the group consisting of a halogen ion, $OH^-$, $ClO_2^-$, a sulfonate ion, a sulfate ion, a carbonate ion, a phosphate ion, a fluorophosphate ion, a borate ion, $AlCl_4^-$, $BiF_6^-$, a fluoroantimony ion, and a fluoroarsenic ion.

* * * * *